United States Patent
Tao et al.

(10) Patent No.: US 12,207,077 B2
(45) Date of Patent: Jan. 21, 2025

(54) USER EQUIPMENT INVOLVED IN NEIGHBOR CELL MEASUREMENT PROCEDURES

(71) Applicant: Panasonic Intellectual Property Corporation of America, Torrance, CA (US)

(72) Inventors: Ming-Hung Tao, Frankfurt am Main (DE); Hidetoshi Suzuki, Kanagawa (JP); Rikin Shah, Langen (DE); Hongchao Li, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 350 days.

(21) Appl. No.: 17/642,200

(22) PCT Filed: Aug. 6, 2020

(86) PCT No.: PCT/EP2020/072131
§ 371 (c)(1),
(2) Date: Mar. 10, 2022

(87) PCT Pub. No.: WO2021/063570
PCT Pub. Date: Apr. 8, 2021

(65) Prior Publication Data
US 2022/0322193 A1  Oct. 6, 2022

(30) Foreign Application Priority Data
Oct. 2, 2019  (EP) .................................... 19201164

(51) Int. Cl.
*H04W 36/30* (2009.01)
*H04W 36/00* (2009.01)
*H04W 36/08* (2009.01)

(52) U.S. Cl.
CPC ... *H04W 36/0058* (2018.08); *H04W 36/0061* (2013.01); *H04W 36/08* (2013.01); *H04W 36/302* (2023.05)

(58) Field of Classification Search
CPC ............. H04W 36/30; H04W 36/0058; H04W 36/0061; H04W 36/32; H04W 48/16;
(Continued)

(56) References Cited

U.S. PATENT DOCUMENTS

2015/0146595 A1* 5/2015 Jamadagni ........ H04W 52/0235
370/311
2016/0095055 A1* 3/2016 Sarrigeorgidis ....... H04B 1/525
370/311
(Continued)

FOREIGN PATENT DOCUMENTS

CN  108307686 A   7/2018
WO  2016175690 A1  11/2016

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode (Release 15)," 3GPP TS 36.304 V15.4.0, Jun. 2019. (55 pages).
(Continued)

*Primary Examiner* — Atique Ahmed
(74) *Attorney, Agent, or Firm* — Seed IP Law Group LLP

(57) ABSTRACT

The present disclosure relates to a user equipment (UE) that comprises a processor, which determines one among a plurality of mobility states for the UE, wherein the plurality of mobility states comprises at least three different mobility states. The processor determines one or more radio measurement quantities of a serving radio cell in which the UE is located. The processor determines whether or not to relax radio measurements on one or more neighbour radio cells, based on the determined mobility state of the UE and the
(Continued)

determined one or more radio measurement quantities of the serving radio cell. A receiver and the processor of the UE perform the radio measurements on the one or more neighbour radio cells according to radio measurement requirements, when the processor determines not to relax the radio measurements on the one or more neighbour radio cells.

18 Claims, 9 Drawing Sheets

(58) Field of Classification Search
CPC  H04W 36/08; H04W 36/302; H04W 36/0088
See application file for complete search history.

(56) References Cited

U.S. PATENT DOCUMENTS

| | | | | |
|---|---|---|---|---|
| 2016/0142926 | A1* | 5/2016 | Yiu | H04L 5/14 370/280 |
| 2017/0150384 | A1 | 5/2017 | Rune et al. | |
| 2018/0332532 | A1* | 11/2018 | Johansson | H04W 24/02 |
| 2019/0387484 | A1* | 12/2019 | Ioffe | H04W 74/0833 |
| 2021/0352507 | A1* | 11/2021 | He | H04W 52/0258 |
| 2022/0338124 | A1* | 10/2022 | Sabouri-Sichani | H04W 24/10 |
| 2022/0361030 | A1* | 11/2022 | Hviid | H04W 36/0085 |

OTHER PUBLICATIONS

3GPP, "3$^{rd}$ Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).
3GPP, "3$^{rd}$ Generation Partnership Project; Technical Specification Group Radio Access Network; NR; Radio Resource Control (RRC) protocol specification (Release 15)," 3GPP TS 38.331 V15.6.0, Jun. 2019. (519 pages).
3GPP, "3$^{rd}$ Generation Partnership Project; Technical Specification Group Radio Access Network; NR; Requirements for support of radio resource management (Release 16)," 3GPP TS 38.133 V16.0.0, Jun. 2019. (299 pages).
3GPP, "3$^{rd}$ Generation Partnership Project; Technical Specification Group Radio Access Network; Evolved Universal Terrestrial Radio Access (E-UTRA); Requirements for support of radio resource management (Release 16)," 3GPP TS 36.133 V16.2.0, Jun. 2019 (3603 pages).
3GPP, "3$^{rd}$ Generation Partnership Project; Technical Specification Group Radio Access Network; NR; Physical channels and modulation (Release 15)," 3GPP TS 38.211 V15.6.0, Jun. 2019. (97 pages).
3GPP, "3$^{rd}$ Generation Partnership Project; Technical Specification Group Radio Access Network; NR; User Equipment (UE) procedures in Idle mode and RRC Inactive state (Release 15)," 3GPP TS 38.304 V15.4.0, Jun. 2019. (29 pages).
3GPP, "3$^{rd}$ Generation Partnership Project; Technical Specification Group Radio Access Network; Study on Scenarios and Requirements for Next Generation Access Technologies; (Release 15)," 3GPP TR 38.913 V15.0.0, Jun. 2018. (39 pages).
3GPP, "3$^{rd}$ Generation Partnership Project; Technical Specification Group Services and System Aspects; System Architecture for the 5G System; Stage 2 (Release 16)," 3GPP TS 23.501 V16.1.0, Jun. 2019. (368 pages).
Extended European Search Report, dated Mar. 27, 2020, for European Application No. 19201164.1-1212. (12 pages).
Huawei, "Considerations on UE mobility information for RRM Measurements," R2-1904234, Agenda Item: 11.11.5, 3GPP TSG-RAN WG2 # 105bis, Xian, China, Apr. 8-12, 2019. (3 pages).
Institute for Information Industry, "Solutions for reducing power consumption for measurements of neighbour cells in NB-IoP," R2-1708258, Agenda Item: 8.11.1, 3GPP TSG RAN WG2#99, Berlin, Germany, Aug. 21-25, 2017. (3 pages).
International Search Report, mailed Oct. 27, 2020, for International Application No. PCT/EP2020/072131. (4 pages).
Nokia, Nokia Shanghai Bell, "Power consumption reduction in RRM measurements," R2-1906697, Agenda Item: 11.11.5, 3GPP TSG-RAN WG2 Meeting #106, Reno, USA, May 13-17, 2019. (6 pages).
Vivo, "Summary#5 of UE power Consumption Reduction in RRM Measurements," R1-1903805, Agenda Item: 7.2.9.3, 3GPP TSG RAN WG1 Meeting #96, Athens, Greece, Feb. 25-Mar. 1, 2019. (59 pages).
Chinese Office Action dated Apr. 22, 2024, for the corresponding Chinese Patent Application No. 202080061671.2, 23 pages. (With English Translation).
Nokia et al., "Power consumption reduction in RRM measurements," R2-1904309, Agenda Item: 11.11.5, 3GPP TSG-RAN WG2 Meeting #105bis, Xian, China, Apr. 8-12, 2019, 8 pages.
OPPO, "UE power Consumption Reduction in RRM Measurements," RI-1903351, Agenda Item: 7.2.9.3. 3GPP TSG RAN WG1 #96, Athens, Greece, Feb. 25-Mar. 1, 2019, 8 pages.
Japanese Notice of Reasons for Rejection, dated Jun. 25, 2024, for Japanese Patent Application No. 2022-519836. (10 pages) (with English translation).
MediaTek Inc., "[Offline-513] Summary of offline related to measurement relaxation criteria," R2-1911620, Agenda Item: 11.11.6, 3GPP TSG-RAN WG2 Meeting #107, Prague, Czech Republic, Aug. 26-30, 2019. (7 pages).
Samsung, "On Triggering Relaxed RRM measurement in RRC_Idle and RRC_Inactive," R2-1909172, Agenda Item: 11.11.6, 3GPP TSG-RAN WG2 Meeting #107, Prague, Czech Republic, Aug. 26-30, 2019. (5 pages).

* cited by examiner

USER EQUIPMENT INVOLVED IN NEIGHBOR CELL MEASUREMENT PROCEDURES

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

One non-limiting and exemplary embodiment facilitates providing procedures for facilitating to improve a measurement procedure.

In an embodiment, the techniques disclosed here feature a user equipment comprising a processor, which determines one among a plurality of mobility states for the UE, wherein the plurality of mobility states comprises at least three different mobility states. The processor determines one or more radio measurement quantities of a serving radio cell in which the UE is located. The processor determines whether or not to relax radio measurements on one or more neighbor radio cells, based on the determined mobility state of the UE and the determined one or more radio measurement quantities of the serving radio cell. A receiver and the processor of the UE perform the radio measurements on the one or more neighbor radio cells according to radio measurement requirements, when the processor determines not to relax the radio measurements on the one or more neighbor radio cells.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

DETAILED DESCRIPTION

5G NR System Architecture and Protocol Stacks

3GPP has been working at the next release for the 5$^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
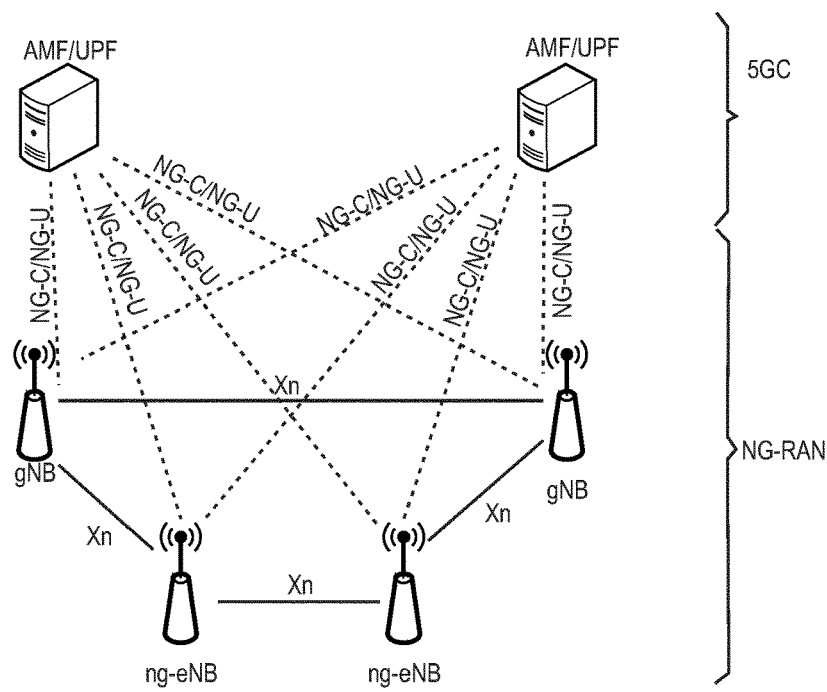
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 2:
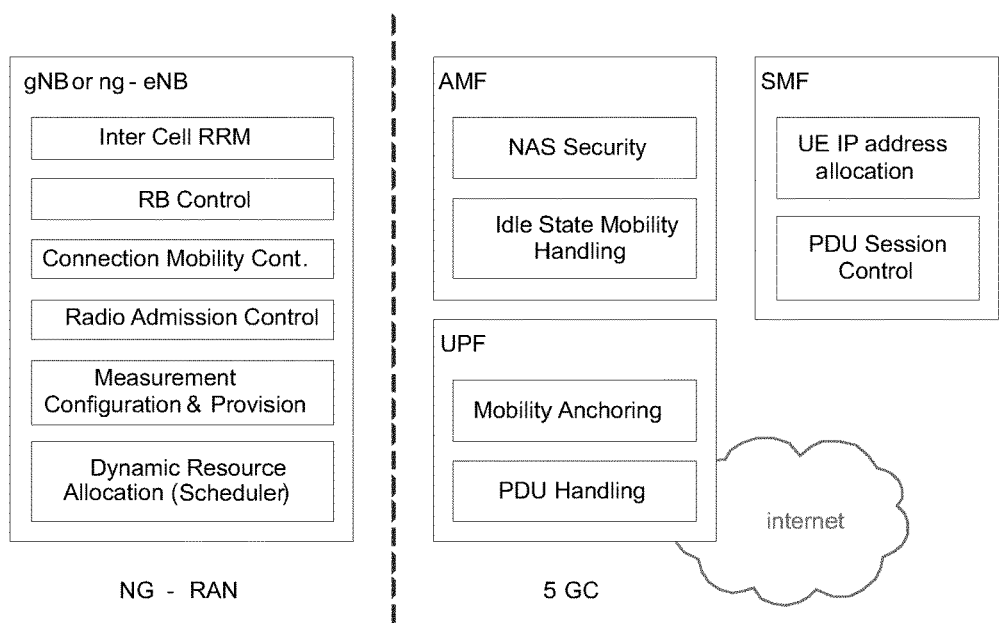
FIG. 2 is a schematic drawing that shows a functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);
IP header compression, encryption and integrity protection of data;
Selection of an AMF at UE attachment when no routing to an AMF can be determined from the information provided by the UE;
Routing of User Plane data towards UPF(s);
Routing of Control Plane information towards AMF;
Connection setup and release;
Scheduling and transmission of paging messages;
Scheduling and transmission of system broadcast information (originated from the AMF or OAM);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity;
Tight interworking between NR and E-UTRA.

The Access and Mobility Management Function (AMF) hosts the following main functions:

Non-Access Stratum, NAS, signaling termination;
NAS signaling security;
Access Stratum, AS, Security control;
Inter Core Network, CN, node signaling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
Session Management Function, SMF, selection.

Furthermore, the User Plane Function, UPF, hosts the following main functions:

Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g., packet filtering, gating, UL/DL rate enforcement;
Uplink Traffic verification (SDF to QoS flow mapping);
Downlink packet buffering and downlink data notification triggering.

Finally, the Session Management function, SMF, hosts the following main functions:

Session Management;
UE IP address allocation and management;
Selection and control of UP function;
Configures traffic steering at User Plane Function, UPF, to route traffic to proper destination;
Control part of policy enforcement and QoS;
Downlink Data Notification.

RRC Connection Setup and Reconfiguration Procedures

Figure 3:
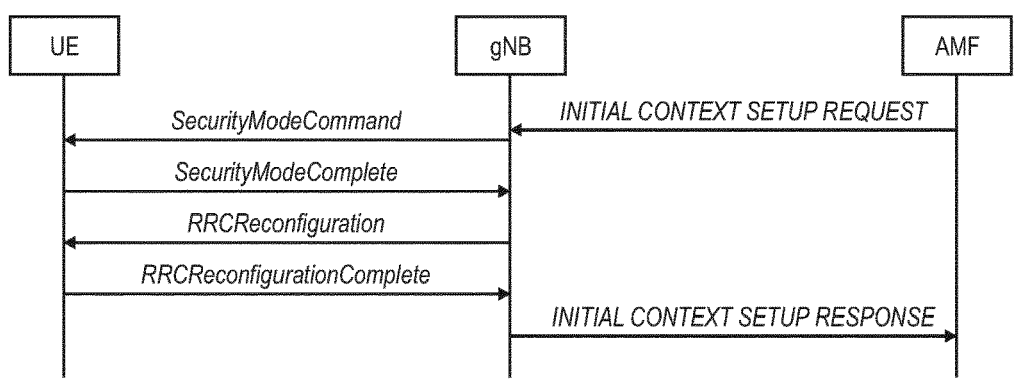
FIG. 3 is a sequence diagram for RRC connection setup/reconfiguration procedures.

FIG. 3 illustrates some interactions between a UE, gNB, and AMF (a 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 4:
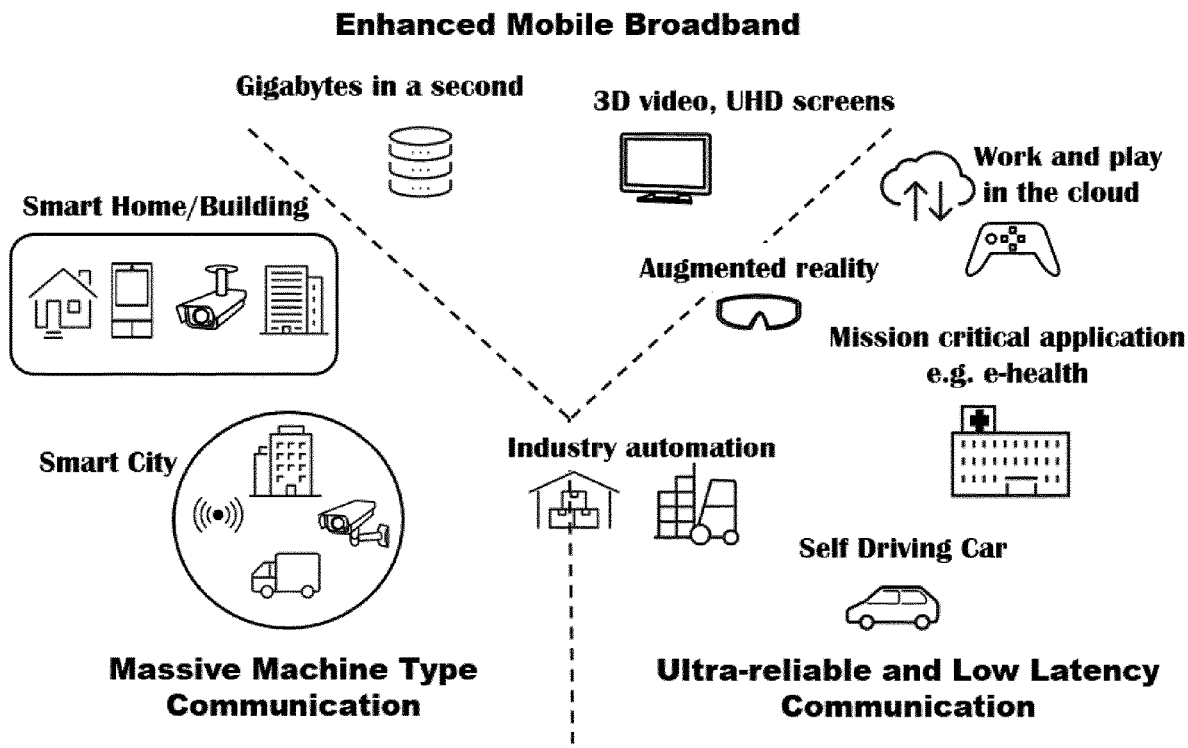
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see, e.g., ITU-R M.20183 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^6$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also, PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
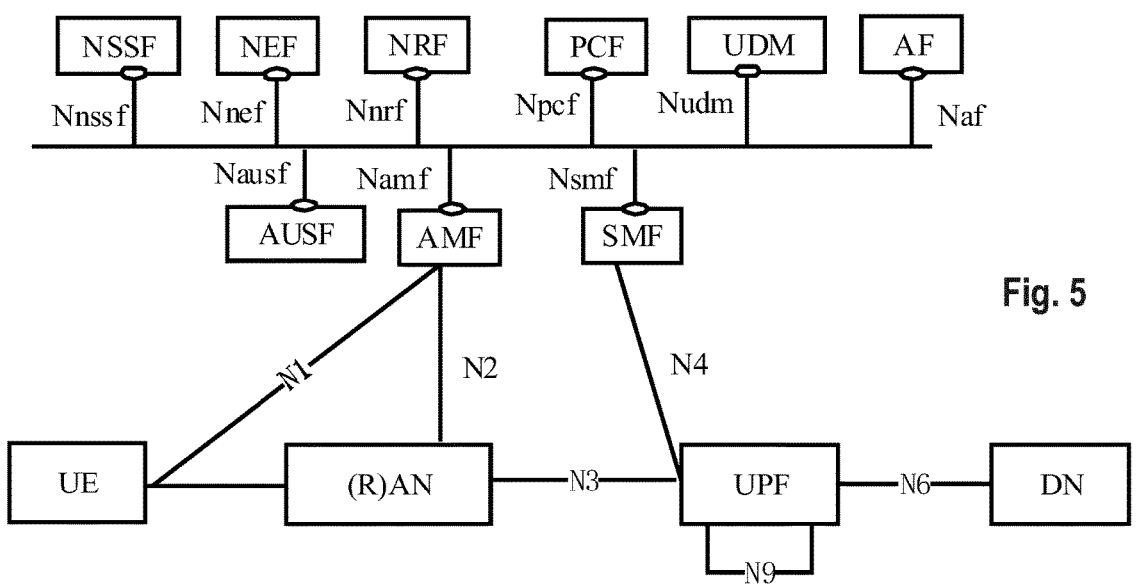
FIG. 5 is a block diagram showing an exemplary 5G system architecture for a non-roaming scenario.

FIG. 5 illustrates a 5G NR non-roaming reference architecture (see TS 23.501 v16.1.0, section 4.23). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMBB and mMTC services to at least one of functions (for example NEF, AMF, SMF, PCF, UPF, etc.) of the 5GC to establish a PDU session including a radio bearer between a gNodeB and a UE in accordance with the QoS requirement and control circuitry, which, in operation, performs the services using the established PDU session.

RRM (Radio Resource Management) Measurements

Radio Resource Measurement (RRM) encompasses a wide range of techniques and procedures, including power control, scheduling, cell search, cell reselection, radio link or connection monitoring/measurements (see 3GPP TS 38.133 v16.0.0 "Requirements for support of radio resource management"). The RRC in NR 5G supports the following three states, RRC Idle, RRC Inactive, and RRC Connected (see section 4.2.1 of TS 38.331 v15.6.0). RRM techniques and reporting mechanism support mobility of the UE. RRM-related actions undertaken by the UE can be broadly divided based on the RRC state of the UE, e.g., the UE being in RRC_IDLE, RRC_INACTIVE, or in RRC_CONNECTED state.

For instance, for a UE in IDLE state, the RRM involves cell selection and cell reselection, while for a UE in INACTIVE state, the RRM involves cell reselection. Cell selection allows the UE to select a suitable cell where to camp on in order to access available services. Cell reselection allows the UE to select a more suitable cell to camp on.

One important aspect of cell selection and cell reselection is the radio measurements that the UE is required to perform for the serving cell and neighboring cells. When camped on a cell, the UE shall regularly search for a better cell according to cell reselection criteria.

In brief to provide the basic outline of measurements, the UE (NR device) can perform measurements based on reference signals (such as CSI-RS, SS Blocks) and obtains measurement results therefrom. These can be used by the UE internally (e.g., cell (re)selection in IDLE or INACTIVE) or by other entities, such as the base station for mobility control (e.g., handover in CONNECTED), after having received some or all measurement results in a corresponding measurement report.

Measurements can be classified in at least three measurement types:
Intra-frequency NR measurements,
Inter-frequency NR measurements
Inter-RAT measurements
For instance, the measurements can be configured by, e.g., defining one or more measurement objects; a measurement object defines, e.g., the carrier frequency to be monitored. Then, for each measurement object one or several reporting configurations can be defined, including reporting criteria such as event-triggered reporting, periodic reporting and event-triggered periodic reporting (see 3GPP TS 38.300 section 9.1). A report configuration indicates the quantity or set of quantities, for instance, different combinations of a channel quality indicator (CQI), a rank indication (RI), a precoder-matrix indicator (PMI), jointly referred to as channel state information (CSI).

Moreover, different radio measurement quantities can be configured for the UE, such as RSRP (Reference Signal Received Power), RSRQ (Reference Signal Received Quality). A further possible radio measurement quantity can be the Signal-to-Interference plus Noise Ratio (SINR). One or more of these radio measurement quantities can be measured by the UE in order to determine the radio quality of a cell, such as the serving radio cell or a neighbor radio cell.

According to one exemplary implementation in a 5G NR standardized case, measurements are performed by the INACTIVE or IDLE UE for the intra-frequency NR neighbor cells, inter-frequency NR neighbor cells, and inter-RAT E-UTRAN neighbor cells as follows (see 3GPP TS 38.133 v16.0.0, sections 4.2.2.3, 4.2.2.4, and 4.2.2.5).

The UE shall measure SS-RSRP and SS-RSRQ at least every $T_{measure,NR\_Intra}$ (see following table 4.2.2.3-1) for intra-frequency cells that are identified and measured according to the measurement rules.

TABLE 4.2.2.3-1

$T_{detect,NR\_Intra}$, $T_{measure,NR\_Intra}$ and $T_{evaluate,NR\_Intra}$

| DRX cycle length [s] | Scaling Factor (N1) FR1 | Scaling Factor (N1) FR2[Note1] | $T_{detect,NR\_Intra}$ [s] (number of DRX cycles) | $T_{measure,NR\_Intra}$ [s] (number of DRX cycles) | $T_{evaluate,NR\_Intra}$ [s] (number of DRX cycles) |
|---|---|---|---|---|---|
| 0.32 | 1 | 8 | 11.52 × N1 × M2 (36 × N1 × M2) | 1.28 × N1 × M2 (4 × N1 × M2) | 5.12 × N1 × M2 (16 × N1 × M2) |
| 0.64 | | 5 | 17.92 × N1 (28 × N1) | 1.28 × N1 (2 × N1) | 5.12 × N1 (8 × N1) |
| 1.28 | | 4 | 32 × N1 (25 × N1) | 1.28 × N1 (1 × N1) | 6.4 × N1 (5 × N1) |
| 2.56 | | 3 | 58.88 × N1 (23 × N1) | 2.56 × N1 (1 × N1) | 7.68 × N1 (3 × N1) |

Note 1:
Applies for UE supporting power class 2&3&4. For UE supporting power class 1, N1 = 8 for all DRX cycle length.

Note 2:
M2 = 1.5 if SMTC periodicity of measured intra-frequency cell >20 ms; otherwise M2 = 1.

The UE shall measure SS-RSRP or SS-RSRQ at least every $K_{carrier}*T_{measure,NR\_Inter}$ (see following table 4.2.2.4-1) for identified lower or equal priority inter-frequency cells, where the parameter $K_{carrier}$ is the number of NR inter-frequency carriers indicated by the serving cell.

TABLE 4.2.2.4-1

$T_{detect,NR\_Inter}$, $T_{measure,NR\_Inter}$ and $T_{evaluate,NR\_Inter}$

| DRX cycle length [s] | Scaling Factor (N1) FR1 | Scaling Factor (N1) FR2[Note1] | $T_{detect,NR\_Inter}$ [s] (number of DRX cycles) | $T_{measure,NR\_Inter}$ [s] (number of DRX cycles) | $T_{evaluate,NR\_Inter}$ [s] (number of DRX cycles) |
|---|---|---|---|---|---|
| 0.32 | 1 | 8 | 11.52 × N1 × 1.5 (36 × N1 × 1.5) | 1.28 × N1 × 1.5 (4 × N1 × 1.5) | 5.12 × N1 × 1.5 (16 × N1 × 1.5) |
| 0.64 |   | 5 | 17.92 × N1 (28 × N1) | 1.28 × N1 (2 × N1) | 5.12 × N1 (8 × N1) |
| 1.28 |   | 4 | 32 × N1 (25 × N1) | 1.28 × N1 (1 × N1) | 6.4 × N1 (5 × N1) |
| 2.56 |   | 3 | 58.88 × N1 (23 × N1) | 2.56 × N1 (1 × N1) | 7.68 × N1 (3 × N1) |

Note 1:
Applies for UE supporting power class 2&3&4. For UE supporting power class 1, N1 = 8 for all DRX cycle length.

Cells (e.g., inter-RAT neighbor radio cells) which have been detected shall be measured at least every $(N_{EUTRA\_carrier})*T_{measure,EUTRAN}$ when the serving cell quality is below a certain threshold (see following table 4.2.2.5-1). The parameter $N_{EUTRA\_carrier}$ is the total number of configured E-UTRA carriers in the neighbor frequency list.

TABLE 4.2.2.5-1

$T_{detect,EUTRAN}$, $T_{measure,EUTRAN}$, and $T_{evaluate,EUTRAN}$

| DRX cycle length [s] | $T_{detect,EUTRAN}$ [s] (number of DRX cycles) | $T_{measure,EUTRAN}$ [s] (number of DRX cycles) | $T_{evaluate,EUTRAN}$ [s] (number of DRX cycles) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32(25) | 1.28 (1) | 6.4 (5) |
| 2.56 | 58.88 (23) | 2.56 (1) | 7.68 (3) |

Measurement Relaxation in LTE

Relaxation criteria is provided so as to allow the UE to skip the neighbor cell measurements and therefore to save UE's power. Already in LTE system, the UE was enabled to relax the neighbor cell measurements under certain circumstances. The following exemplary implementation of the measurement relaxation procedure was provided according to the 3GPP LTE standards (see 3GPP TS 36.304 v15.4.0, section 5.2.4.2).

Following rules are used by the UE to limit needed measurements:
  If the serving cell fulfils Srxlev>$S_{IntraSearchP}$ and Squal≥$S_{IntraSearchQ}$, the UE may choose not to perform intra-frequency measurements.
  Otherwise, the UE shall perform intra-frequency measurements.
  The UE shall apply the following rules for E-UTRAN inter-frequencies and inter-RAT frequencies which are indicated in system information and for which the UE has priority provided as defined in 5.2.4.1:
  For an E-UTRAN inter-frequency or inter-RAT frequency with a reselection priority higher than the reselection priority of the current E-UTRA frequency the UE shall perform measurements of higher priority E-UTRAN inter-frequency or inter-RAT frequencies according to IS 36.133 [10].
  For an E-UTRAN inter-frequency with an equal or lower reselection priority than the reselection priority of the current E-UTRA frequency and for inter-RAT frequency with lower reselection priority than the reselection priority of the current E-UTRAN frequency:
  If the serving cell fulfils Srxlev>$S_{nonIntraSearchP}$ and Squal>$S_{nonIntraSearchQ}$, the UE may choose not to perform measurements of E-UTRAN inter-frequencies or inter-RAT frequency cells of equal or lower priority unless the UE is triggered to measure an E-UTRAN inter-frequency which is configured with redistributionInterFreqInfo.
  Otherwise, the JE shall perform measurements of E-UTRAN inter-frequencies or inter-RAT frequency cells of equal or lower priority according to TS 36.133 [10].
  If the UE supports relaxed monitoring and s-SearchDeltaP is present in SystemInformationBlockType3, the UE may further limit the needed measurements, as specified in sub-clause 5.2.4.12.

Moreover, different measurement relaxation rules are provided for cell re-selection for NB-IoT (NarrowBand Internet of Thing) devices, which are (mostly) stationary and should be allowed to relax neighbor cell measurements more often (see 3GPP TS 36.304 v15.4.0, section 5.2.4.2a):

When evaluating Srxlev and Squal of non-serving cells for reselection purposes, the UE shall use parameters provided by the serving cell.

Following rules are used by the UE to limit needed measurements:
  If the serving cell fulfils Srxlev>$S_{IntraSearchP}$, the UE may choose not to perform intra-frequency measurements.
  Otherwise, the UE shall perform intra-frequency measurements.
  The UE shall apply the following rules for NB-IoT inter-frequencies which are indicated in system information:
  If the serving cell fulfils Srxlev>$S_{nonIntraSearchP}$, the UE may choose not to perform inter-frequency measurements.
  Otherwise, the UE shall perform inter-frequency measurements.
  If the UE supports relaxed monitoring and s-SearchDeltaP is present in SystemInformationBlockType3-NB, the UE may further limit the needed measurements, as specified in sub-clause 5.2.4.12.

To better understand the above parameters, 3GPP TS 36.304 provides the following definitions.

The parameter "Squal" is to be understood, e.g., as a cell selection quality value (dB), e.g., the RSRQ. The parameter "Srxlev" is to be understood, e.g., as a cell selection RX level value (dB), e.g., the RSRP. The parameter "$S_{IntraSearchP}$" specifies the Srxlev threshold (in dB) for intra-frequency measurements. The parameter "$S_{IntraSearchQ}$" specifies the Squal threshold (in dB) for intra-frequency measurements. The parameter "$S_{nonIntraSearchP}$" specifies the Srxlev threshold (in dB) for E-UTRAN inter-frequency and inter-RAT measurements. The parameter "$S_{nonIntraSearchQ}$" specifies the Squal threshold (in dB) for E-UTRAN inter-frequency and inter-RAT measurements.

In effect, the above relaxation rules for the neighbor cell measurement are based on certain radio-quality-related measurement relaxation criteria, which are fulfilled when a corresponding radio quality measurement for the serving cell (here, e.g., "Squat" "Srxlev") is higher than a corresponding threshold (here, e.g., "$S_{IntraSearchP}$," "$S_{IntraSearchQ}$," "$S_{nonIntraSearchP}$," "$S_{nonIntraSearchQ}$"). For instance, this can be understood in that the when the UE is at the cell center (e.g., serving cell quality that the UE experiences is high enough), the neighbor cell measurements can be relaxed, while neighbor cell measurements should not be relaxed when the UE is at the cell edge (e.g., serving cell quality that the UE experiences is not high enough).

Moreover, relaxed monitoring measurement rules are provided in the LTE 3GPP standard that define further relaxation in addition to the above (see 3GPP TS 36.304 v15.4.0):

5.2.4.12.0 Relaxed Monitoring Measurement Rules

When the UE is required to perform intra-frequency or inter-frequency measurement according to the measurement rules in sub-clause 5.2.4.2 or 5.2.4.2a, the UE may choose not to perform intra-frequency or inter-frequency measurements when:

The relaxed monitoring criterion in sub-clause 5.2.4.12.1 is fulfilled for a period of $T_{SearchDeltaP}$, and Less than 24 hours have passed since measurements for cell reselection were last performed, and The UE has performed intra-frequency or inter-frequency measurements for at least $T_{SearchDeltaP}$ after selecting or reselecting a new cell.

5.2.4.12.1 Relaxed Monitoring Criterion

The relaxed monitoring criterion is fulfilled when:

$(Srxlev_{Ref}-Srxlev) < S_{SearchDeltaP}$,

Where:

Srxlev=current Srxlev value of the serving cell (dB).

$Srxlev_{Ref}$=reference Srxlev value of the serving cell (dB), set as follows:

After selecting or reselecting a new cell, or

If(Srxlev−$Srxlev_{Ref}$)>0, or

If the relaxed monitoring criterion has not been met for $T_{SearchDeltaP}$:

the UE shall set the value of $Srxlev_{Ref}$ to the current Srxlev value of the serving cell;

$T_{SearchDeltaP}$=5 minutes, or the eDRX cycle length if eDRX is configured and the eDRX cycle length is longer than 5 minutes.

The parameter "$S_{SearchDeltaP}$" specifies the Srxlev delta threshold (in dB) during relaxed monitoring. In effect, the above relaxed monitoring criterion is a criterion that is fulfilled when the radio quality (here Srxlev) has not changed too much (here less than a threshold amount "<$S_{SearchDeltaP}$") during a past period of time (here "$T_{SearchDeltaP}$"). This relaxation solution can be understood to determine the mobility of the UE through the evaluation of the serving cell quality change during a particular time period. For instance, a stationary UE (e.g., the serving cell quality does not change or changes only a little) can significantly relax the neighbor cell measurements, which does not apply to non-stationary UEs (e.g., where the serving change quality changes more than the corresponding threshold).

In summary, as disclosed above, the neighbor cell measurements are relaxed by allowing the UE to choose not to perform measurements (be it intra-frequency measurements on neighboring radio cells, or inter-frequency measurements on neighboring radio cells, or inter-RAT measurements on neighboring radio cells) when one or more radio measurement quantiles for the serving cell fulfill certain criteria (here, e.g., "Srxlev>$S_{IntraSearchP}$ and Squal>$S_{IntraSearchQ}$." "Srxlev>$S_{IntraSearchP}$ and Squal>$S_{nonIntraSearchQ}$." "(Srxlev_{Ref}$−Srxlev)<$S_{SearchDeltaP}$" and for NB-IoT devices "Srxlev>$S_{IntraSearchP}$").

Measurements and Measurement Relaxation in 5G NR

Correspondingly, according to an exemplary current solution for 5G NR, measurement rules have already been defined which allow the UE to not perform neighbor cell measurements in certain circumstances (see 3GPP TS 38.304 v15.4.0, section 5.2.4.2):

Following rules are used by the UE to limit needed measurements:

If the serving cell fulfils Srxlev>$S_{IntraSearchP}$ and Squal>$S_{IntraSearchQ}$, the UE may choose not to perform intra-frequency measurements.

Otherwise, the UE shall perform intra-frequency measurements.

The UE shall apply the following rules for NR inter-frequencies and inter-RAT frequencies which are indicated in system information and for which the UE has priority provided as defined in 5.2.4.1:

For a NR inter-frequency or inter-RAT frequency with a reselection, priority higher than the reselection priority of the current NR frequency, the UE shall perform measurements of higher priority NR inter-frequency or inter-RAT frequencies according to IS 38.133 [8].

For a NR inter-frequency with an equal or lower reselection priority than the reselection priority of the current NR frequency and for inter-RAT frequency with lower reselection priority than the reselection priority of the current NR frequency:

If the serving cell fulfils Srxlev>$S_{nonIntraSearchP}$ and Squal>$S_{nonIntraSearchQ}$, the UE may choose not to perform measurements of NR inter-frequencies or inter-RAT frequency cells of equal or lower priority;

Otherwise, the UE shall perform measurements of NR inter-frequencies or inter-RAT frequency cells of equal or lower priority according to TS 38.133 [8].

As apparent from the above and quite similar to the corresponding LTE solution of TS 36.133, the above relaxation of the neighbor cell measurements is based on certain radio-quality-related measurement relaxation criteria, which are fulfilled when a corresponding radio quality measurement for the serving cell (here, e.g., "Squal" "Srxlev") is higher than a corresponding threshold (here, e.g., "$S_{IntraSearchP}$," "$S_{IntraSearchQ}$," "$S_{nonIntraSearchP}$," "$S_{nonIntraSearchQ}$").

A current RRM power saving study deals with how to allow additionally reducing power consumption for the RRM measurements, and seeks to define how to implement relaxation of the RRC measurements. Some relaxation solutions already adopted for 3GPP LTE can be used as a starting point for considerations on how to improve measurement relaxation in 5G NR.

For instance, one further relaxation for 5G NR could also be based on the amount of serving cell quality change during a particular period of time, as implemented in LTE, thus effectively allowing significant measurement relaxation for stationary UEs.

However, the inventors have identified that applying the same or similar LTE solutions to 5G NR would have disadvantages and would not be optimal for an NR UE to save power while at the same time allowing mobility of the UE.

For instance, some measurement relaxation rules used for the LTE UEs (e.g., for intra-frequency measurements: $Srxlev > S_{IntraSearchP}$ and $Squal > S_{IntraSearchQ}$; for inter-frequency and inter-RAT measurements: $Srxlev \geq S_{nonIntraSearchP}$ and $Squal\ S_{nonIntraSearchQ}$) allows the UE, if the serving cell radio quality is high enough, to choose not to perform the measurements on the neighbor radio cells. Put differently, if the UE is not at the cell edge, the UE is allowed to not perform neighbor radio cell measurements at all. However, this may result problematic for high-mobility UEs which can move to the cell edge in a short time (due to their high mobility), because in such a case cell selection/cell reselection may not be performed in a timely manner due to the missing measurements. This negatively affects the mobility performance. Such problem may occur more often in 5G NR FR2 cases (Frequency Range 2 includes millimeter frequency bands from 24.25 GHz to 52.6 GHz that provide shorter range but higher available bandwidth than bands in the FR1), because the cell size is usually small and therefore it is more likely for the high-mobility UE to move from cell center to cell edge in a very short time.

On the other hand, a UE at the cell edge (e.g., where the serving cell radio quality is below a threshold) is not allowed to relax the measurement requirements. This is also the case for a UE that, although non-stationary, is a low-mobility UE, and which thus is not allowed to save power at all. However, this does not prove optimal when being applied to low-mobility UEs, which thus consume power unnecessarily, even though they will not need the measurements results for mobility purposes due to their low-mobility.

In summary, the current solutions consider the serving cell quality as well as the stationary/non-stationary attribute of the UE, independently from one another, which is one of the reasons for resulting in the above-identified disadvantages. In brief, if the serving cell quality is good enough, UEs are allowed to not perform measurements, irrespective of their level of mobility. On the other hand, if UEs are stationary not moving enough, they are allowed to not perform measurements irrespective of their position in the cell.

Figure 6:
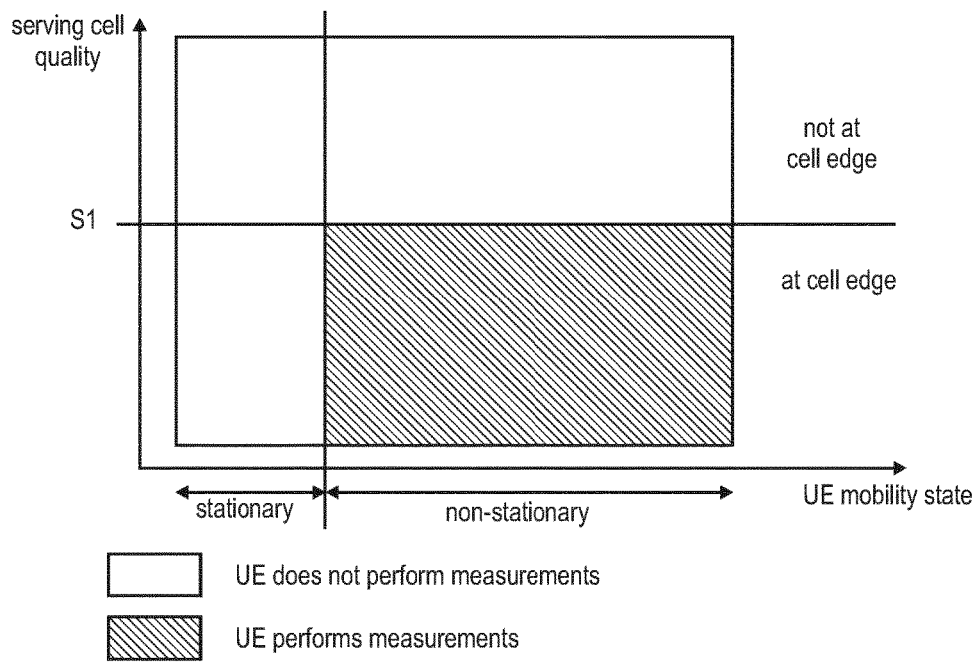
FIG. 6 is a diagram that illustrates when the UE is allowed to relax neighbor cell measurements, depending on the serving cell quality and the distinction between stationary UEs and non-stationary UEs, according to prior art solutions.

FIG. 6 is a diagram illustrating in a simplified and exemplary manner the relationship between the UE mobility state and the serving cell quality and the resulting measurement requirements for the UE. On the x-axis the mobility state of the UE is presented, differentiated between stationary and non-stationary UEs. On the y-axis the serving cell quality experienced by the UE is presented, differentiated between a UE being at the cell edge (e.g., below a threshold, here called S1) and not at cell edge (e.g., cell center; above threshold S1).

As shown in FIG. 6, the solutions for LTE (and if fully adopted also for 5G NR) provide that stationary UEs are basically always allowed to not perform the neighbor cell measurements. On the other hand, measurement relaxation based on the serving cell radio quality is depicted in FIG. 6 depending on the threshold SL. To facilitate illustration, only one threshold S1 (could be the Srxlev (RSRP) or the Squal (RSRQ) or a virtual combination of Srxlev and Squal) is used to conceptually visualize the measurement relaxation based on the serving cell quality. As apparent, a UE with serving cell quality above threshold S1 is allowed to not perform the neighbor cell measurements.

The inventors have identified that the currently envisioned solutions for 5G NR measurement relaxation only distinguish between two actions for the UE, 1) measure or 2) not measure. This is rather restrictive and makes it difficult to optimize the UE power consumption. A finer control mechanism would be beneficial.

Moreover, the inventors have identified that the currently envisioned solutions for 5G NR measurement relaxation only distinguish the UE mobility in a binary manner, stationary vs. non-stationary, and only distinguish the UE position in a binary manner, cell edge vs. non-cell-edge. Again, this is rather restrictive and makes it difficult to optimize the UE power consumption. A finer control mechanism would be beneficial.

Correspondingly, there is a need for improving measurement procedure performed by the UE, and specifically the measurement procedure on how to relax the measurement requirements so as to allow the UE opportunities to save power. Improving the measurement procedure may facilitate overcoming one or more of the above-identified problems.

In the following, UEs, base stations, and procedures to meet these needs will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Figure 7:
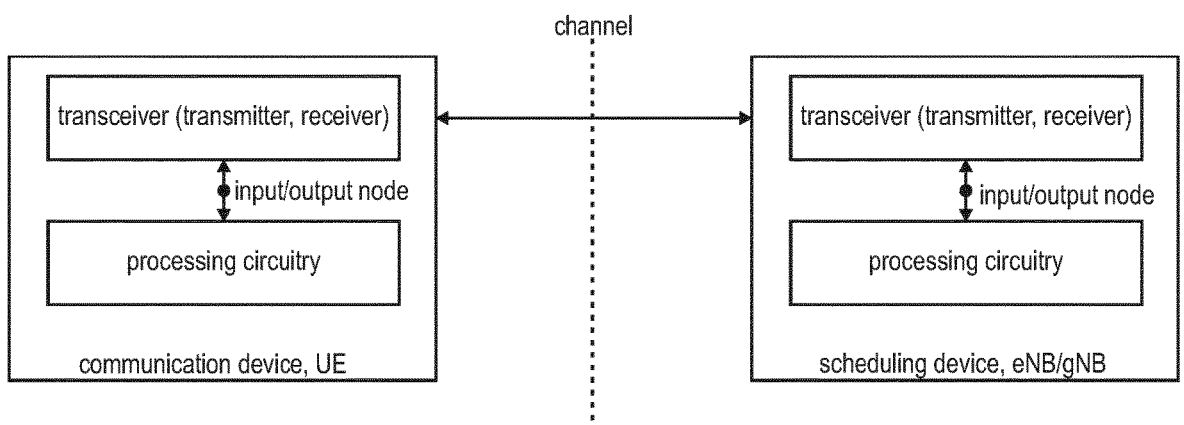
FIG. 7 illustrates the exemplary and simplified structure of a UE and a gNB.

FIG. 7 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

An improved measurement procedure on how to perform and not perform radio measurements for neighbor cells will be described in the following.

Figure 8:
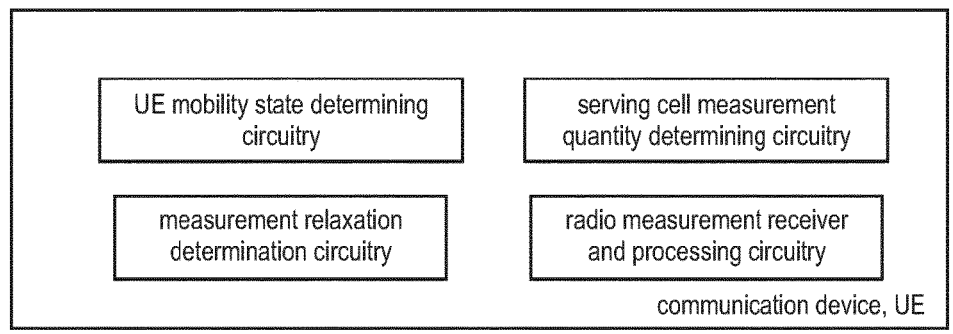
FIG. 8 illustrates a structure of the UE according to an exemplary implementation of an improved measurement procedure.

FIG. 8 illustrates a simplified and exemplary UE structure according to one solution of the improved measurement procedure, and can be implemented based on the general UE structure explained in connection with FIG. 7. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent from FIG. 8, the UE may include UE mobility state determining circuitry, serving cell measurement quantity determining circuitry, measurement relaxation determination circuitry, and a receiver and processing circuitry for performing radio measurements.

In the present case as will become apparent from the below disclosure, the processing circuitry can thus be exemplarily configured to at least partly perform one or more of determining one among a plurality of mobility states for the UE, determining one or more radio measurement quantities of a serving radio cell, determining whether or not to relax radio measurements on one or more neighbor radio cell, and perform radio measurements on the one or more neighbor radio cells, etc.

The receiver can thus be exemplarily configured to at least partly perform one or more of performing radio measurements on the one or more neighbor radio cells, etc.

One solution as will be disclosed in more detail further below is implemented by a UE that includes the following. A processor of the UE determines one among a plurality of mobility states for the UE, wherein the plurality of mobility states comprises at least three different mobility states. The processor further determines one or more radio measurement quantities of a serving radio cell in which the UE is located. The processor further determines whether or not to relax radio measurements on one or more neighbor radio cells, based on the determined mobility state of the UE and the determined one or more radio measurement quantities of the serving radio cell. A receiver and the processor of the UE perform the radio measurements on the one or more neighbor radio cells according to radio measurement requirements, when the processor determines not to relax the radio measurements on the one or more neighbor radio cells.

Figure 9:
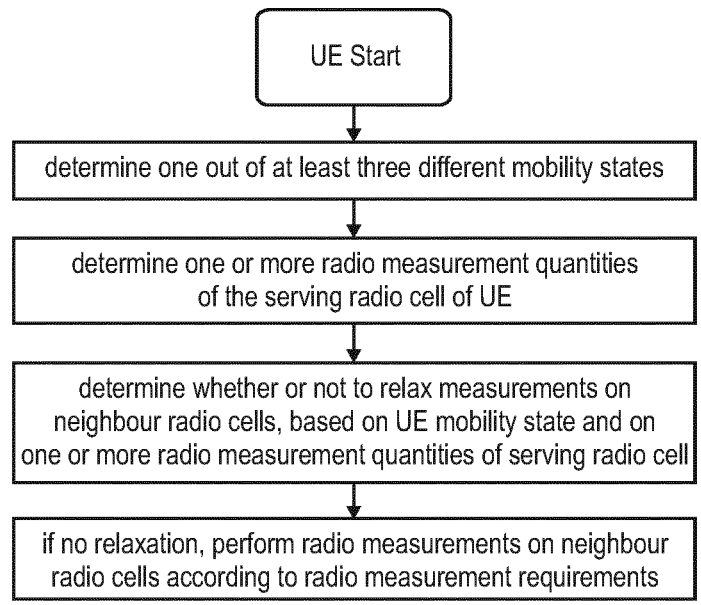
FIG. 9 is a flow diagram for the behavior of a UE, according to an exemplary implementation for an improved measurement procedure.

A corresponding sequence diagram for an exemplary UE behavior in line with the above-discussed UE is illustrated in FIG. 9.

Correspondingly, a UE is provided that performs an exemplary improved neighbor cell measurement method, which facilitates at least the following advantages. The restrictions identified for prior art solutions are solved, because there are at least three different mobility states for the UE and because the decision on whether to relax or not the neighbor cell measurements depends on the UE's mobility state as well as radio measurement quantities. The neighbor cell measurement relaxation can thus be applied more precisely, thereby facilitating an optimal power saving and at the same time having only a small negative impact on the supported mobility of the UE.

The above solution as well as variants and further improvements on the above solution will be explained in more detail below.

For the following explanations of the solutions for the improved handover procedure, some basic assumptions are exemplarily made herein. For instance, it is assumed that the UE is already configured and supports to perform radio measurements on one or more neighbor radio cells. While in the following some of explanations are given primarily with respect to the 5G NR communications systems, the improved measurement procedure is also applicable to LTE or LTE-A communication systems. Moreover, when considering an implementation in current 3GPP standards for 5G NR (also for LTE), it is assumed that the UE is in an RRC_Idle or RRC_Inactive state and performs cell selection or cell re-selection, which involves the requirement to perform radio measurements of neighbor radio cells to find a suitable or better cell to camp on. The UE is thus not actively communicating with the network and the UE may not experience a communication interruption due to relaxed measurement requirements. Conversely, the following improved measurement procedure and relaxation need not be applied for UEs in RRC_Connected state, which should rather not relax the measurement requirements at all, so as to not cause any connection interruption. However, although not assumed in the following, the improved measurement procedure could also be applied to a UE in Connected state.

Moreover, the radio measurements on the neighbor cell and the serving cell can be performed to obtain parameters that reflect the respective radio cell quality, which can be reflected by corresponding radio measurement quantities. The radio measurement quantities can be configured for the UE, and comprise for instance RSRP (Reference Signal Received Power), RSRQ (Reference Signal Received Quality), and the Signal-to-Interference plus Noise Ratio (SINR).

According to the above solution, at least three mobility states are differentiated for the UE and then used for determining whether to relax or not the neighbor cell measurements. Exemplarily, in the context of the improved measurement procedure, the UE can be in a low-mobility state, medium-mobility state or high-mobility state. Moreover, a stationary mobility state can be considered as well, which however is less relevant for the improved measurement method because a finer control of the neighbor cell measurement relaxation for stationary UEs might not be necessary (e.g., stationary UEs never perform neighbor cell measurements). Nonetheless, the improved neighbor cell measurement method can also be applied when more than three different mobility states of a UE are distinguished. However, in the following the above noted three different mobility states, low, medium, high, will be used to explain the concepts underlying the improved neighbor cell measurement method.

The mobility states of the UE can be determined by the UE in various different manners. For instance, the following information and parameters can be determined and used to determine the mobility state of the UE.

As a first example, the number of cell reselections in a suitable past time period can be analyzed. In said respect, the amount of time as well as one or more thresholds are configured for the UE. In general, it is assumed that the higher the number of cell reselections, the higher the mobility level of the UE. According to one exemplary implementation, two thresholds can be defined: a medium threshold and a high threshold, wherein if the number of cell reselections of the UE is below the medium threshold, the UE could be determined to be in a low-mobility state (or normal-mobility state, which is used in 3GPP TS 38.304); if the number of cell reselections of the UE is above the medium threshold but below the high threshold, the UE could be determined to be in a medium-mobility state; and if the number of cell reselections of the UE is above the high threshold, the UE could be determined to be in a high-mobility state. Alternatively or additionally, different time periods can be defined so as to distinguish between the different mobility states based on the number of cell reselections.

A criterion similar to the number of cell reselection is the number of beam changes in a past period of time. Again, it is assumed that the higher the number of beam changes, the higher the mobility of the UE. According to one exemplary implementation, two thresholds can be defined: a medium threshold and a high threshold, wherein if the number of beam changes of the UE is below the medium threshold, the UE could be determined to be in a low-mobility state; if the number of beam changes of the UE is above the medium threshold but below the high threshold, the UE could be determined to be in a medium-mobility state; and if the number of beam changes of the UE is above the high threshold, the UE could be determined to be in a high-mobility state. Alternatively or additionally, different time periods can be defined so as to distinguish between the different mobility states based on the number of beam changes.

Another criterion for determining the mobility state of the UE is the fading situation regarding a radio measurement quantity of the serving cell in a past period of time. Here it is assumed that when a UE moves, the received signal strength more or less changes. Thus, the amount of change during a particular time allows distinguishing the different mobility states of the UE. For instance, if such a change occurs in a relatively short time, the UE can be considered to be in a high-mobility state, while a UE in a medium-mobility state would be defined as experiencing less change during the same amount of time or similar change during a longer amount of time. Finally, a low-mobility UE would experience only a little change in the relevant radio measurement quantity (reflecting the serving cell signal strength). Thus, according to specific exemplary implementations, suitable thresholds for the amount of change of the serving cell signal strength and/or the time period can be defined and used for distinguishing between the mobility states of the UE.

Moreover, the mobility state can be derived from position information of the UE during a past period of time. The position information can be, e.g., obtained from GPS (Global Positioning System) signals that the UE can monitor. For instance, based on the position information, the UE can determine the rate of movement of the UE and thus derive the mobility state, using suitable thresholds for the rate of movement.

According to further criteria, the UE is defined to be in a particular mobility state based on a characteristic of the UE. For instance, a UE that is mounted on a vehicle can by definition be considered as a high-mobility UE. Correspondingly, such a vehicle UE would be a high-mobility UE even though the vehicle and UE have not been moving for quite some time. For instance, if the historic records (e.g., log files) show that a UE always appears in different cells, such a UE can be considered as a high-mobility UE. Such a criterion has the advantage that it does not require measurements to be repeatedly performed by the UE.

Another criterion that could be used to determine the mobility state of the UE is based on the type of the UE. For instance, a UE supporting or actively using Ultra-Reliable Low-Latency Communication, URLLC, could be defined to be a high-mobility UE, because relaxation of the neighbor cell measurements should be avoided for UEs with low-latency communication. For example, a UE that is configured for carrying out the Mission Critical Service (i.e., the Access Identity of the UE is equal to 2) could be defined to be a high-mobility UE, as power saving is not an important aspect to such kind of UE (instead, mobility performance is an important aspect). Again, the UE does not have to repeatedly perform any measurements and complex determinations to derive its mobility state.

The UE can determine its mobility state based on one or a combination of several of the above presented criteria.

One of the steps explained above was that the UE determines one or more radio measurement quantities of the serving cell in which the UE is located, where the radio measurement quantities may be, e.g., the RSRP, the RSRQ or the SINR. The radio measurements can be, e.g., performed on reference signals transmitted by the serving base station.

The improved neighbor cell measurement procedure shall also provide the UE with opportunities to save power by relaxing the neighbor cell measurements if possible. According to an exemplary implementation of the improved neighbor cell measurement procedure, relaxation of the neighbor cell measurements can be achieved by either not performing the neighbor cell measurements at all or performing the neighbor cell measurements according to relaxed radio measurement requirements. Not performing the neighbor cell measurements maximizes the possibility of saving power in the UE, however may be detrimental to supporting mobility and thus delaying a cell reselection. On the other hand, introducing the concept of relaxed radio measurement requirements allows for providing a configurable tradeoff between the power saving advantage and the negative impact of the relaxed measurements. For instance, the normal, non-relaxed radio measurement requirement may require the UE to perform neighbor cell measurements at least every particular period of time (e.g., at least once every second). In such a case, a relaxed radio measurement requirement could allow the UE to relax the neighbor cell measurements to be performed less often relative to the non-relaxed requirements, e.g., at least once every five seconds. The relaxation of the neighbor cell measurements for the UE can thus be controlled more precisely taking duly into account the real world necessities and opportunities to save power, in contrast to the binary relaxation choice of performing or not performing the neighbor cell measurements.

According to one exemplary implementation, this relative relaxation of the radio measurement requirements based on relaxed measurement requirements can be achieved by defining a scaling factor that is to be used in combination with the non-relaxed normal radio measurement requirements. In the above used example, where the relaxed measurement is performed every five second compared to every second according to the non-relaxed measurement, the scaling factor would be 5.

The relative relaxation can also be made dependent on the mobility state of the UE, such that different scaling factors would be used by the UE in different mobility states. For instance, for high-mobility UEs the scaling factor should be rather small, such that relaxation of the measurements is small as well, thus limiting the negative impact on the mobility of the high-mobility UEs. On the other hand, for low-mobility UEs, the scaling factor could be high, in order to achieve a higher power saving, at the low risk of a higher negative impact on the mobility of the low-mobility UE.

Moreover, the relative relaxation can also be made dependent on the radio measurements of the serving cell (e.g., reflecting the position of the UE in the cell). For instance, a UE that is determined to have a high signal strength of the serving cell (e.g., UE is at the cell center) could use a scaling factor of $\infty$ (meaning that no neighbor cell measurements need to be performed); a UE that is determined to have medium signal strength of its serving cell (e.g., UE is a non-cell-edge case, but not at cell center) could use a scaling factor of $>1$ (meaning that some relaxation of the measurements is applied); a UE that is determined to have a low signal strength of its serving cell (e.g., UE is at cell edge) could use a scaling factor of $=1$ (meaning no relaxation of the neighbor cell measurements is applied).

According to one possible exemplary implementation in a 5G NR standardized communication system, the corresponding measurements indications could be adapted to support such a scaling factor for implementing the relaxation of the neighbor cell measurements. In particular, 3GPP TS 38.133 provides rules for the measurements of intra-frequency cells, inter-frequency cells and inter-RAT cells (see sections 4.2.2.3, 4.2.2.4, and 4.2.2.5), comprising respective tables indicating parameters for the measurements.

According to this implementation, the measurement rules and tables could be adapted as follows.

The respective tables for measurements for intra-frequency cells and measurements for inter-frequency cells already use a scaling factor N1 that influences the length of the parameter $T_{measure,NR\_Intra}$ and $T_{measure,NR\_Inter}$. As currently standardized, the scaling factor depends on the frequency range and the DRX cycle. Additionally, scaling factor N1 may be adapted by another scaling factor k that implements a relaxation of the neighbor cell measurements depending on the mobility state or cell position as explained above: N1'=N1*k, where k can be a positive integer signaled in the system information. In line with the above, if more additional relaxation scaling factors are to be used, several factor k1, k2, k3 . . . can be defined.

For instance, the corresponding tables would be adapted as follows, where in the columns $T_{measure,NR\_Intra}$ and $T_{measure,NR\_Inter}$ the N1 parameter is replaced with N1'.

TABLE 4.2.2.3-1

$T_{detect,NR\_Intra}$, $T_{measure,NR\_Intra}$ and $T_{evaluate,NR\_Intra}$

| DRX cycle length [s] | Scaling Factor (N1) FR1 | Scaling Factor (N1) FR2[Note1] | $T_{detect,NR\_Intra}$ [s] (number of DRX cycles) | $T_{measure,NR\_Intra}$ [s] (number of DRX cycles) | $T_{evaluate,NR\_Intra}$ [s] (number of DRX cycles) |
|---|---|---|---|---|---|
| 0.32 | 1 | 8 | 11.52 × N1 × M2 (36 × N1 × M2) | 1.28 × N1' × M2 (4 × N1' × M2) | 5.12 × N1 × M2 (16 × N1 × M2) |
| 0.64 | | 5 | 17.92 × N1 (28 × N1) | 1.28 × N1' (2 × N1') | 5.12 × N1 (8 × N1) |
| 1.28 | | 4 | 32 × N1 (25 × N1) | 1.28 × N1' (1 × N1') | 6.4 × N1 (5 × N1) |
| 2.56 | | 3 | 58.88 × N1 (23 × N1) | 2.56 × N1' (1 × N1') | 7.68 × N1 (3 × N1) |

Note 1:
Applies for UE supporting power class 2&3&4. For UE supporting power class 1, N1 = 8 for all DRX cycle length.

Note 2:
M2 = 1.5 if SMTC periodicity of measured intra-frequency cell >20 ms; otherwise M2 = 1.

TABLE 4.2.2.4-1

$T_{detect,NR\_Inter}$, $T_{measure,NR\_Inter}$ and $T_{evaluate,NR\_Inter}$

| DRX cycle length [s] | Scaling Factor (N1) FR1 | FR2[Note1] | $T_{detect,NR\_Inter}$ [s] (number of DRX cycles) | $T_{measure,NR\_Inter}$ [s] (number of DRX cycles) | $T_{evaluate,NR\_Inter}$ [s] (number of DRX cycles) |
|---|---|---|---|---|---|
| 0.32 | 1 | 8 | 11.52 × N1 × 1.5 (36 × N1 × 1.5) | 1.28 × N1' × 1.5 (4 × N1' × 1.5) | 5.12 × N1 × 1.5 (16 × N1 × 1.5) |
| 0.64 | | 5 | 17.92 × N1 (28 × N1) | 1.28 × N1' (2 × N1') | 5.12 × N1 (8 × N1) |
| 1.28 | | 4 | 32 × N1 (25 × N1) | 1.28 × N1' (1 × N1') | 6.4 × N1 (5 × N1) |
| 2.56 | | 3 | 58.88 × N1 (23 × N1) | 2.56 × N1' (1 × N1') | 7.68 × N1 (3 × N1) |

Note 1:
Applies for UE supporting power class 2&3&4. For UE supporting power class 1, N1 = 8 for all DRX cycle length.

Measurements for inter-RAT cells as currently defined in TS 38.133 to not make use of a scaling factor N1. Therefore, an additional scaling k can be introduced to implement the measurement relaxation according to the improved measurement procedure as explained above. As apparent from the adapted table, the column $T_{measure,EUTRAN}$, is extended by the scaling factor k.

TABLE 4.2.2.5-1

$T_{detect,EUTRAN}$, $T_{measure,EUTRAN}$, and $T_{evaluate,EUTRAN}$

| DRX cycle length [s] | $T_{detect,EUTRAN}$ [s] (number of DRX cycles) | $T_{measure,EUTRAN}$ [s] (number of DRX cycles) | $T_{evaluate,EUTRAN}$ [s] (number of DRX cycles) |
|---|---|---|---|
| 0.32 | 11.52 (36) | k × 1.28 (4) | 5.12 (16) |
| 0.64 | 17.92 (28) | k × 1.28 (2) | 5.12 (8) |
| 1.28 | 32(25) | k × 1.28 (1) | 6.4 (5) |
| 2.56 | 58.88 (23) | k × 2.56 (1) | 7.68 (3) |

The improved neighbor cell measurement procedure shall provide the UE with opportunities to save power by relaxing the neighbor cell measurements if possible. As presented above, the improved method thus involves the step of determining by the UE whether or not to relax the radio measurements on the one or more neighbor radio cells. This determination is based on the UE's current mobility state and the radio measurements performed by the UE on the serving cell, thus being based on both. To begin with, the different relaxation criteria (related to the measured radio quality, thus exemplary also termed radio-quality-related measurement relaxation criteria) will be defined and then it will be explained how these radio-quality-related measurement relaxation criteria additionally depend on the mobility state of the UE, so as to implement the step of the improved method of determining whether or not to relax the neighbor cell radio measurements based on both the mobility state of the UE and the measured radio measurements quantities.

According to an exemplary implementation, whether or not to relax the neighbor cell measurements can be determined by determining whether or not one or more of a plurality of relaxation criteria are fulfilled. A first relaxation criterion is fulfilled when one or more of the measured radio measurement quantities for the serving radio cell has changed, during a past period of time, less than a threshold amount. In other words, if one or more radio measurement quantities do not change too much, relaxation of the neighbor cell measurements can be applied. The radio measurement quantity can be, e.g., the RSRP, RSRQ or SINR parameter.

According to one exemplary implementation, the first relaxation criterion is fulfilled when one radio measurement quantity (e.g., the RSRP, RSRQ, or SINR) changes less than the corresponding threshold (respectively, being an RSRP-based threshold, an RSRQ-based threshold, or an SINR-based threshold). On the other hand, according to further implementations, the first relaxation criterion is fulfilled when more than one radio measurement quantity (e.g., two or more out of the RSRP, RSRQ, SINR) change less than the corresponding threshold (respectively, being an RSRP-based threshold, an RSRQ-based threshold, or an SINR-based threshold).

According to a particular exemplary implementation in a 5G NR standardized communication system, the first relaxation criterion can be similar to the relaxed monitoring solution of TS 36.304 section 5.2.4.12 discussed above. Accordingly, the UE determines that the first relaxation criterion is fulfilled when $(SrxleRef-Srxlev) < S_{SearchDeltaP}$, where Srxlev=current Srxlev value of the serving cell (dB).
$Srxlev_{Ref}$=reference Srxlev value of the serving cell (dB), set as follows:
After selecting or reselecting a new cell, or
If $(Srxlev-Srxlev_{Ref}) > 0$, or
If the relaxed monitoring criterion has not been met for $T_{SearchDeltaP}$:
  the UE shall set the value of $Srxlev_{Ref}$ to the current Srxlev value of the serving cell;
$T_{SearchDeltaP}$=5 minutes, or the eDRX cycle length if eDRX is configured and the eDRX cycle length is longer than 5 minutes.

Then, the UE may thus choose not to perform intra-frequency or inter-frequency measurements on neighbor cells when this first relaxation criterion is fulfilled for the period of time.

Alternatively or additionally to the above first relaxation criterion, a second relaxation criterion can be used to determine whether or not the neighbor cell measurements are to be relaxed and is fulfilled when one or more of the radio measurement quantities measured for the serving radio cell is higher than a respective quantity threshold. Each of the radio measurement quantities can be, e.g., the RSRP, RSRQ or SINR parameter. For instance, assuming that the radio measurement quantity is the RSRP, the second relaxation criterion provides a comparison of the measured RSRP value with a suitable RSRP threshold. According to another example, the second relaxation criterion is based on the comparison of two or more measured quantities against their respective threshold, and only when all of the two or more measured quantities are above their respective threshold, the second relaxation criterion is considered fulfilled.

According to a particular exemplary implementation in a 5G NR standardized communication system, the second relaxation criterion can be similar to the relaxation solution of TS 36.304 discussed above. For instance, if the serving cell fulfils (Srxlev>$S_{IntraSearchP}$ and Squal>$S_{IntraSearchQ}$), the UE may choose not to perform intra-frequency measurements, and if the serving cell fulfils Srxlev>$S_{nonIntraSearchP}$ and Squal>$S_{nonIntraSearchQ}$, the UE may choose not to perform measurements of E-UTRAN inter-frequencies or inter-RAT frequency cells. Another second relaxation criterion can be applied to a particular type of UE, such as to the NB IoT UEs, where for instance, if the serving cell fulfils Srxlev>$S_{IntraSearchP}$, the UE may choose not to perform intra-frequency measurements, and if the serving cell fulfils Srxlev>$S_{nonIntraSearchP}$, the UE may choose not to perform inter-frequency measurements.

According to one exemplary implementation, each of the two relaxation criterion its own justifies that the neighbor cell measurements are relaxed. Alternative, neighbor cell measurements are relaxed only when both the first and the second relaxation criteria are fulfilled. In the following, it is exemplarily assumed that fulfilling one of the relaxation criteria suffices for the UE to relax the neighbor cell measurements.

As explained above, according to the improved measurement procedure, the UE determines whether to relax the neighbor cell measurements based on both the radio measurement quantities and the UE's mobility state, which can be implemented in several different manners as will be explained in the following. For instance, the radio-quality-related measurement relaxation criteria (see above examples) are made dependent on the UE's mobility state so as to also take into account the mobility state and not only the radio measurements when deciding on the relaxation of the neighbor cell measurements.

According to a first variant of the relaxation determination, the above-introduced second relaxation criterion (when one or more of the radio measurement quantities measured for the serving radio cell is higher than a respective quantity threshold) is made dependent on the mobility state of the UE as follows. For instance, for high-mobility UEs, the second relaxation criterion shall never be fulfilled. Thus, for example, even though the UE experiences a very good signal strength from its serving cell and is above the corresponding threshold (e.g., the UE is at the cell center), the UE is not allowed to relax its neighbor cell measurements. This ensures that the mobility is not negatively impacted for high-mobility UEs, thereby accepting that no power can be saved as a result. On the other hand, the second relaxation criterion shall still be applicable to UEs in other mobility states (e.g., the low and medium mobility).

According to this first variant of the relaxation determination, UEs that are vehicle mounted or supporting URLLC also determine to not relax the neighbor cell measurements based on the second relaxation criterion.

Figure 10:
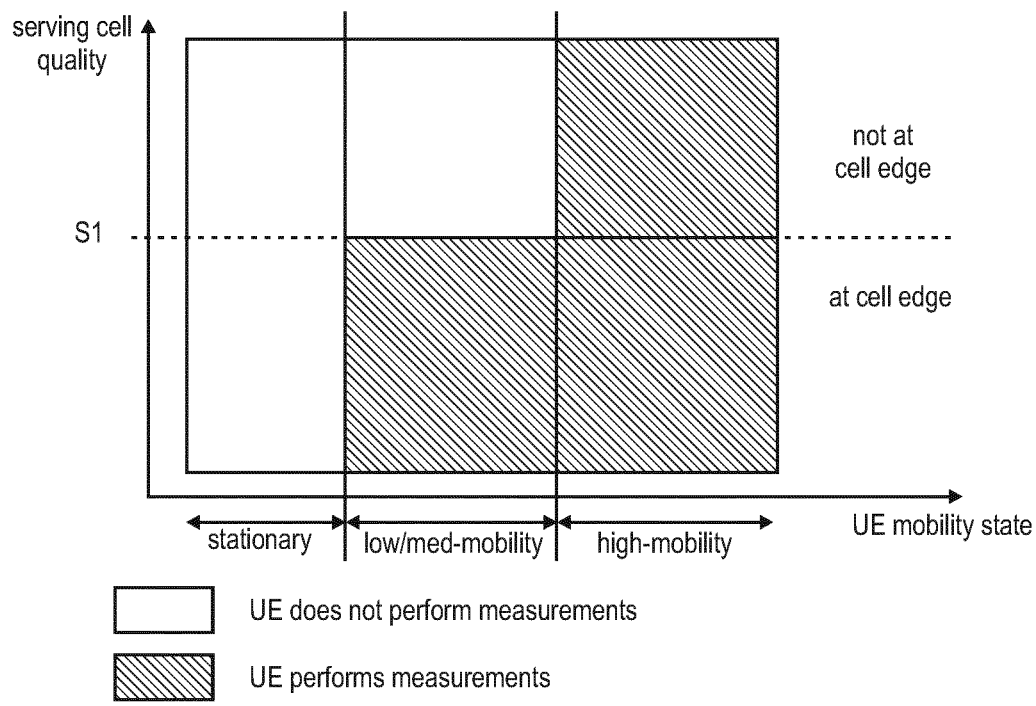
FIG. 10 is a diagram that illustrates whether and how the UE is allowed to relax neighbor cell measurements, depending on the mobility state of the UE and the serving cell quality, according to a first variant of the improved measurement procedure.

FIG. 10 illustrates, in a similar manner as FIG. 6, a diagram showing in a simplified and exemplary manner the relationship between the UE mobility state and the serving cell quality as well as the resulting neighbor cell measurement performed by the UE, as a result of this first variant of relaxation determination. It is exemplarily illustrated that relaxation is determined based on the serving cell quality, which can be considered to be a parameter derived from one or a combination of the radio measurement quantities (such as RSRP, RSRQ, or SINR). The low-mobility and medium-mobility states are shown together in the x-axis of FIG. 10 so as to facilitate illustration. As apparent therefrom, a high-mobility UE will not have the opportunity to save power by relaxing the neighbor cell measurements, because the second relaxation criterion does not apply to high-mobility UEs (see explanations for first variant) and because—even if additionally applied—the first relaxation criterion is most likely not fulfilled due to the UE being in a high-mobility state (where the serving cell signal strength changes often and continuously). On the other hand, measurement relaxation is still possible for UEs in the low-mobility or medium-mobility states, namely when the second relaxation criterion is fulfilled, here in FIG. 10, e.g., when the serving cell radio quality (be it one or a combination of the RSRP, RSRQ, SINR) is above the corresponding threshold S1.

According to a second variant of the relaxation determination, the above-introduced second relaxation criterion (when one or more of the radio measurement quantities measured for the serving radio cell is higher than a respective quantity threshold) is made dependent on the mobility state of the UE as follows. In particular, the second relaxation criterion is based on the comparison of the measured radio measurement quantities to a respective quantity threshold. According to this second variant of the relaxation determination, the respective quantity threshold can have different values for different mobility states. This could also be put differently, different thresholds apply for different mobility states.

For instance, for a UE in a high-mobility state, a first value is used for the quantity threshold of the second relaxation criterion, whereas for a UE in another mobility state (e.g., the low-mobility or medium-mobility state) a second value is used for the quantity threshold of the second relaxation criterion. The first value is larger than the second value of this quantity threshold, such that UEs in high-mobility state perform measurement relaxation only when the serving cell strength is exceptionally good (e.g., UE is in the very cell center). Thus, high-mobility UEs are less likely to relax neighbor cell measurements, which reduces the risk that the mobility of such high-mobility UEs is negatively impacted by the measurement relaxation.

According to this second variant of the relaxation determination, UEs that are vehicle mounted or supporting URLLC also use a higher quantity threshold value to determine whether to relax the neighbor cell measurements based on the second relaxation criterion. Similarly, a coverage enhancement UE (CAT-M1) can use still other different values S1 and/or S2 of the quantity threshold, because the S1 and S2 values used for normal UEs are not suitable for coverage enhancement UEs that are able to reliably communicate at significantly less serving cell signal strength. Correspondingly, the S1_CE and S2_CE of the quantity threshold to be applied by coverage enhancement UEs can be lower than the respective S1 and S2 values of the quantity threshold to be applied by other UEs.

Figure 11:
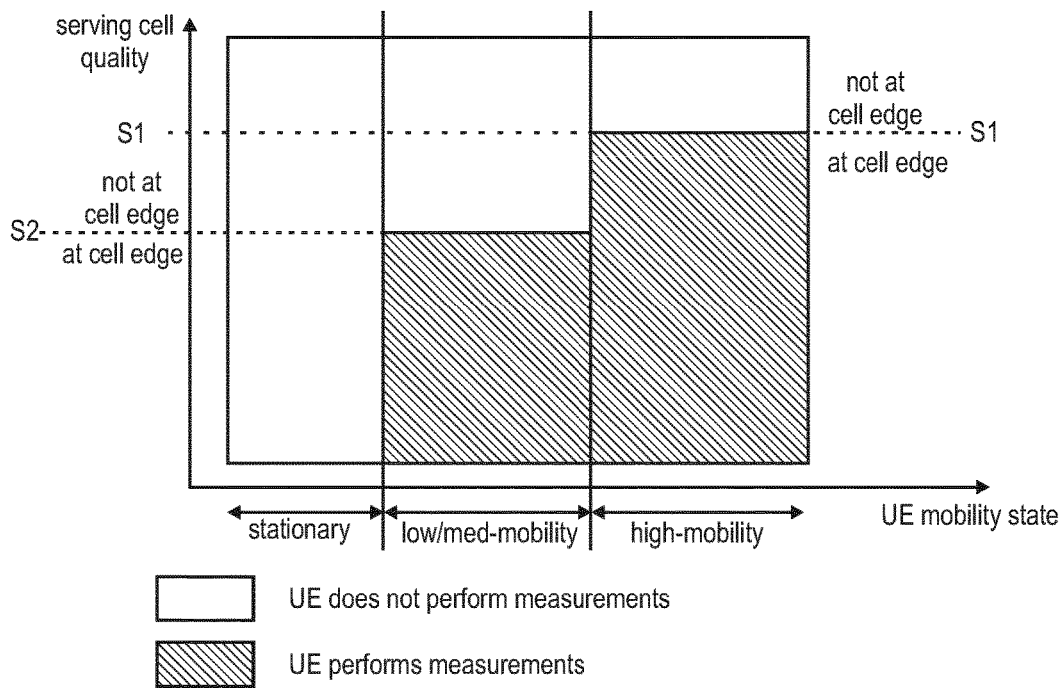
FIG. 11 is a diagram that illustrates whether and how the UE is allowed to relax neighbor cell measurements, depending on the mobility state of the UE and the serving cell quality, according to a second variant of the improved measurement procedure.

The results of this exemplary second variant of the relaxation determination are illustrated in FIG. 11, which shows in a simplified and exemplary manner the relationship between the UE mobility state and the serving cell quality as well as the resulting neighbor cell measurement performed by the UE. To simplify the illustration, it is exemplarily assumed that the second relaxation criterion is determined based on only one radio measurement quantity (be it RSRP, RSRQ, or SINR), such that the one radio measurement quantity is compared against one suitable quantity threshold. According to this second variant, the quantity threshold has two different values S1 and S2 that are used depending on the mobility state of the UE. The first value S1 is used for the threshold by a high-mobility UE, while the second (lower) value S2 is used for the threshold by low-mobility and medium-mobility UEs.

The above second variant of the relaxation determination has been exemplified in FIG. 11, based on the second relaxation criterion considering only one radio measurement quantity. However, conceptually the second variant of the relaxation determination can also be applied when the second relaxation criterion considers more than one radio measurement quantity, by providing different mobility-state-dependent values for each of the respective quantity thresholds.

Moreover, the above second variant of the relaxation determination has been exemplified in FIG. 11 based on the assumption of having only two different values for one quantity threshold, here one for high-mobility UEs and the other one for UEs in the remaining mobility states. However, conceptually the second variant of the relaxation determination can also be applied when distinguishing more mobility states, by correspondingly providing one quantity threshold value for each of the mobility states to be distinguished.

Instead of making the above-introduced second relaxation criterion (when one or more of the radio measurement quantities measured for the serving radio cell is higher than a respective quantity threshold) strictly dependent on the mobility state of the UE, a further solution of the improved measurement procedure relies on the concept of the relaxed radio measurement requirements mentioned before. Such a solution determines whether or not to relax the neighbor cell measurements based on the second relaxation criterion in the same manner for all UEs, irrespective of their mobility states. However, how to relax the neighbor cell measurements depends on the mobility state of the UE. For instance, a high-mobility-state UE will not completely relax the neighbor cell measurements (e.g., not perform any neighbor cell measurements) but rather performs neighbor cell measurements according to relaxed radio measurement requirements by for instance performing neighbor cell measurements less often (see explanations above regarding relaxed measurement requirements). On the other hand, low-mobility UEs and medium-mobility UEs, when determining to relax the neighbor cell measurements, do not perform the neighbor cell measurements at all.

Figure 12:
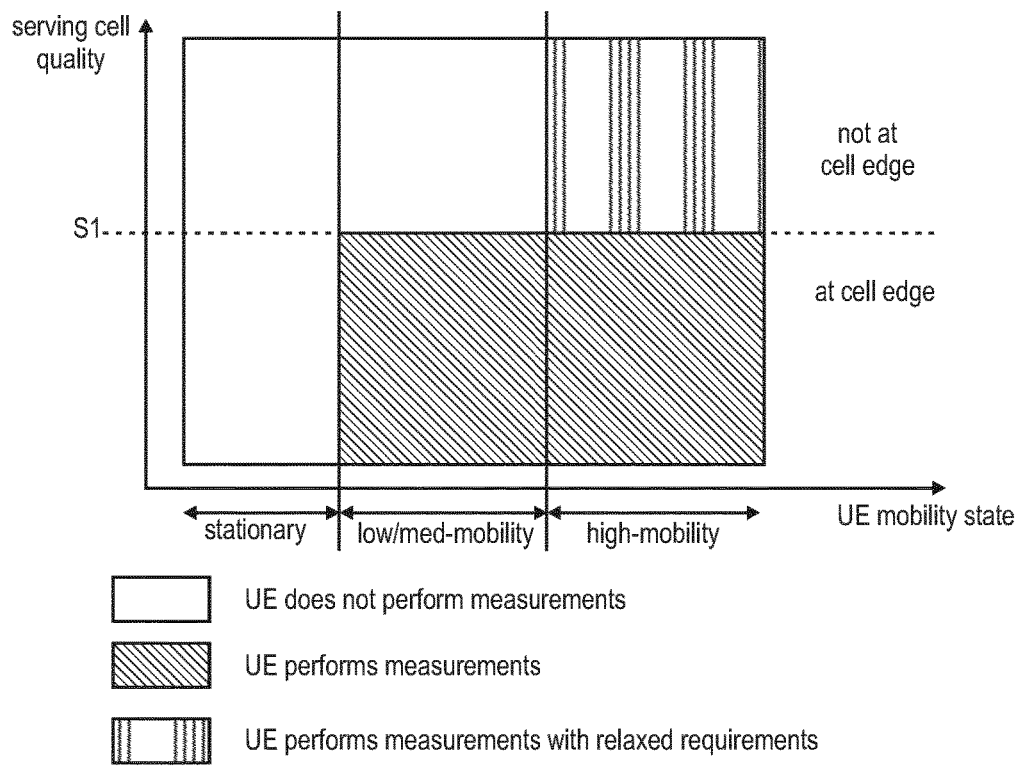
FIG. 12 is a diagram that illustrates whether and how the UE is allowed to relax neighbor cell measurements, depending on the mobility state of the UE and the serving cell quality, according to a another variant of the improved measurement procedure.

The results of the solution are illustrated in FIG. 12, which shows in a simplified and exemplary manner the relationship between the UE mobility state and the serving cell quality as well as the resulting neighbor cell measurements performed by the UE. It is exemplarily illustrated that relaxation is determined based on the serving cell quality, which can be considered to be a parameter derived from one or a combination of the radio measurement quantities (such as RSRP, RSRQ, or SINR). The low-mobility and medium-mobility states are shown together in the x-axis of FIG. 10 so as to facilitate illustration. As apparent therefrom, a high-mobility UE will have the opportunity to relax the neighbor cell measurements based on relaxed radio measurement requirements, rather than not performing the neighbor cell measurements at all as applicable for low-mobility UEs and medium-mobility UEs. Nevertheless, this still allows the high-mobility UEs to reduce the power consumption, while limiting the negative impact of the measurement relaxation on the mobility of the UE.

The above variants and solutions presented in connection with FIGS. 10, 11, and 12 optimize the measurement relaxation for high-mobility UEs so as to ensure that the mobility is not negatively impacted, for instance sacrificing power saving opportunities in said respect. Compared with a measurement procedure as envisioned for FIG. 6, the above variants and solutions of FIGS. 10, 11, and 12 provide different advantages and disadvantages. For instance, while the solution of FIG. 10 has the slightest negative impact on the mobility of the high-mobility UE, it fails to provide power saving opportunities for the high-mobility UEs. The solution of FIG. 11 takes the risk of negatively impacting the mobility of a high-mobility UE in exchange of providing the high-mobility UE with power saving opportunities, albeit only when experiencing very good signal strength from its serving cell. Moreover, the solution of FIG. 12 provides great flexibility in finding a configurable trade-off between saving power and managing the negative impact on the mobility of a high-mobility UE, by appropriately defining the relaxed radio measurement requirements that the UE has to follow when determining to relax the neighbor cell measurements.

While the above solutions presented in connection with FIGS. 10, 11, and 12 focus on optimizing the relaxation procedure for high-mobility UEs, the following solution focuses on optimizing the relaxation procedure for low-mobility UEs. For instance, for a UE in the low-mobility state, an additional second quantity threshold is defined for the second relaxation criterion that has a lower value than the first quantity threshold already mentioned before. No such additional second quantity threshold need to be used for medium or high-mobility UEs.

Consequently, a low-mobility UE compares the measured signal strength of the serving cell against the two thresholds to determine whether and how to relax the neighbor cell measurements. In particular, when the signal strength of the serving radio cell is higher than this second, lower, quantity threshold but still smaller than the previously known quantity threshold, the UE determines to relax the neighbor cell measurements by performing the neighbor cell measurements according to relaxed radio measurement requirements (for details on the relaxed measurement requirements, see above). When the UE determines that the signal strength is larger than the first, higher, quantity threshold (thus also higher than the second quantity threshold), the UE may decide to relax the neighbor cell measurements more heavily by not performing them at all.

Figure 13:
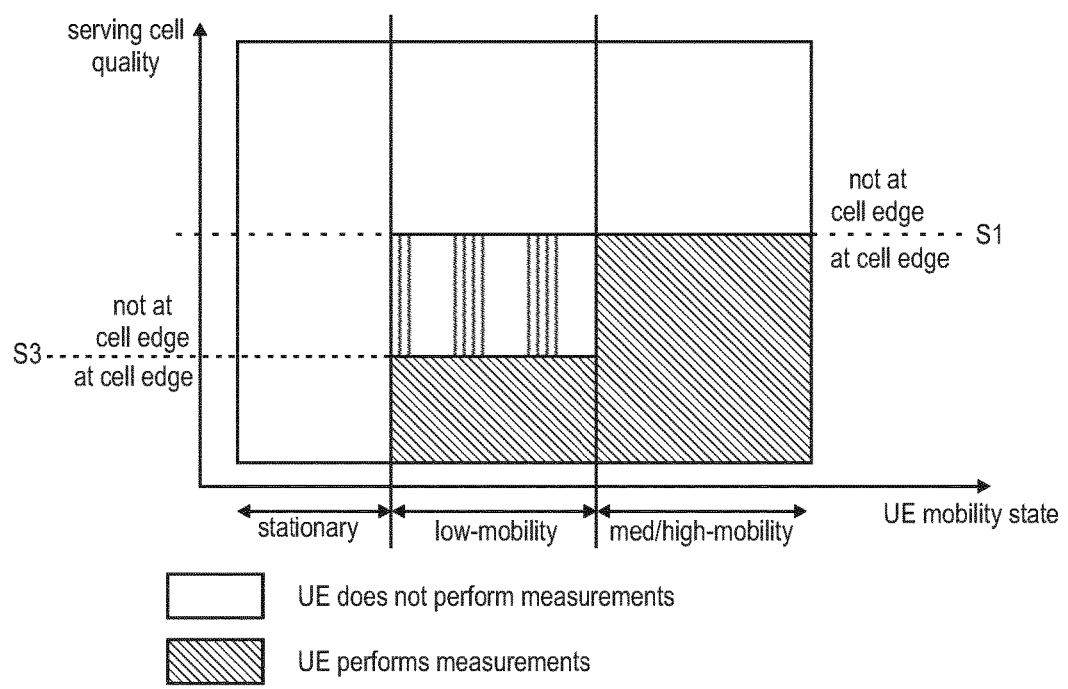
FIG. 13 is a diagram that illustrates whether and how the UE is allowed to relax neighbor cell measurements, depending on the mobility state of the UE and the serving cell quality, according to a further variant of the improved measurement procedure.

The results of this solution are illustrated in FIG. 13, which shows in a simplified and exemplary manner the relationship between the UE mobility state and the serving cell quality as well as the resulting neighbor cell measurements performed by the UE. For ease of illustration, medium-mobility UEs and high-mobility UEs are illustrated together in FIG. 13. As apparent therefrom, the relaxation opportunity is different for low-mobility UEs allowing that the low-mobility UEs perform measurement relaxation already as of the additional second threshold (here in FIG. 13 S3). Low-mobility UEs thus can save more power.

The above solution exemplified in FIG. 13 is based on the second relaxation criterion considering only one radio measurement quantity. However, conceptually the solution can also be applied when the second relaxation criterion considers more than one radio measurement quantity, by providing different second quantity thresholds for each of the respective measurement quantities.

Moreover, the above solution exemplified in FIG. 13 is based on the assumption of having only one additional quantity threshold for the low-mobility UEs. However, conceptually the solution can also be applied to more mobility states, by correspondingly providing additional second quantity thresholds for each of the mobility states in addition to the respective first quantity threshold.

Figure 14:
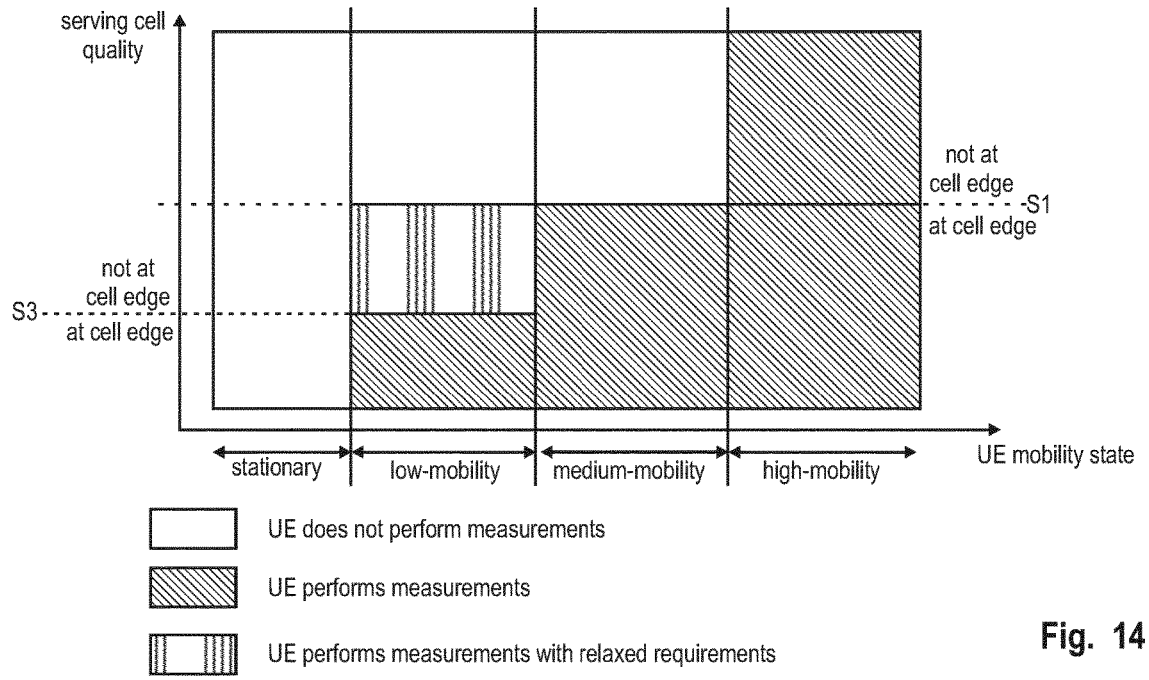
FIG. 14 is a diagram that illustrates whether and how the UE is allowed to relax neighbor cell measurements, depending on the mobility state of the UE and the serving cell quality, according to a combination of the solutions of FIGS. 10 and 13, according to an exemplary implementation of the improved measurement procedure.

Optimizing measurement relaxation for high-mobility UEs was explained in connection with FIGS. 10, 11, and 12, while FIG. 13 was used to explain how to optimize measurement relaxation for low-mobility UEs. Above, these optimizations have been described separately and as stand-alone. However, these two optimization schemes can also be combined so as to provide an optimized measurement relaxation procedure for both low-mobility and high-mobility UEs. FIG. 14 illustrates a combination of the solution presented with respect to FIG. 10 and with the solution presented with respect to FIG. 13. Accordingly, as apparent therefrom, relaxation of the neighbor cell measurements is not provided for high-mobility UEs, is provided for medium-mobility UEs experiencing a serving cell quality higher than the threshold S1, and is provided for low-mobility UEs experiencing a serving cell quality higher than the threshold S3 (here by performing neighbor cell measurements but with relaxed requirements) and is provided for low-mobility UEs experiencing a serving cell quality higher than the threshold S1 (here by not performing neighbor cell measurements at all).

Figure 15:
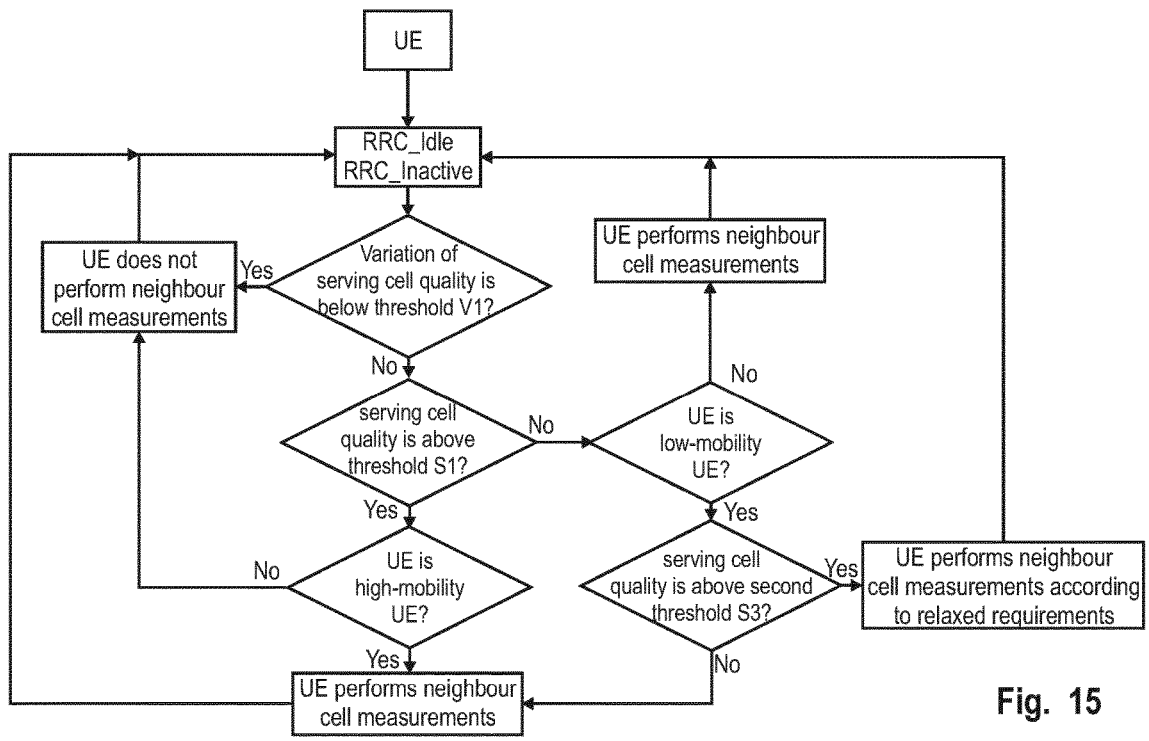
FIG. 15 is a flow diagram for the UE behavior, according to a combination of the solutions of FIGS. 10 and 13, according to an exemplary implementation of the improved measurement procedure.

The UE behavior for such an exemplary implementation of such a combined solution is presented in FIG. 15. The UE behavior takes also into account the first relaxation criterion mentioned above, according to which relaxation is allowed for the UE when one or more of the measured radio measurement quantities for the serving radio cell has changed, during a past period of time, less than a threshold amount (in FIG. 15 named V1) (not shown in FIG. 14). As presented in the exemplary implementation of FIG. 15, the UE adapts the measurement relaxation procedure depending on the mobility state of the UE, so as to achieve that the high-mobility UE does not perform measurement relaxation at all, so as to achieve that the medium-mobility UE performs measurements relaxation when the UE's serving cell quality is above the threshold S1, and so as to achieve that the low-mobility UE performs relaxation depending on the UE's serving cell quality with respect to the two thresholds S1 and S3 (where S1 has a higher value than S3).

Combinations are also possible of the solutions presented with respect to FIG. 11 and FIG. 12 respectively with the solution presented with respect to FIG. 13.

Figure 16:
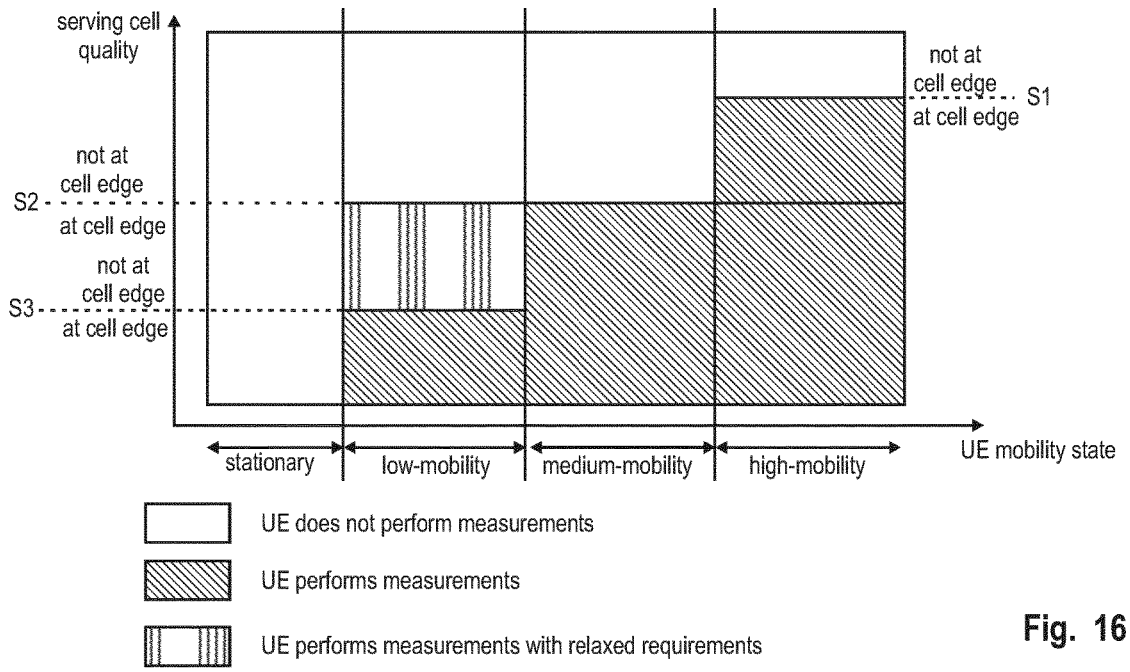
FIG. 16 is a diagram that illustrates whether and how the UE is allowed to relax neighbor cell measurements, depending on the mobility state of the UE and the serving cell quality, according to a combination of the solutions of FIGS. 11 and 13, according to an exemplary implementation of the improved measurement procedure.
Figure 17:
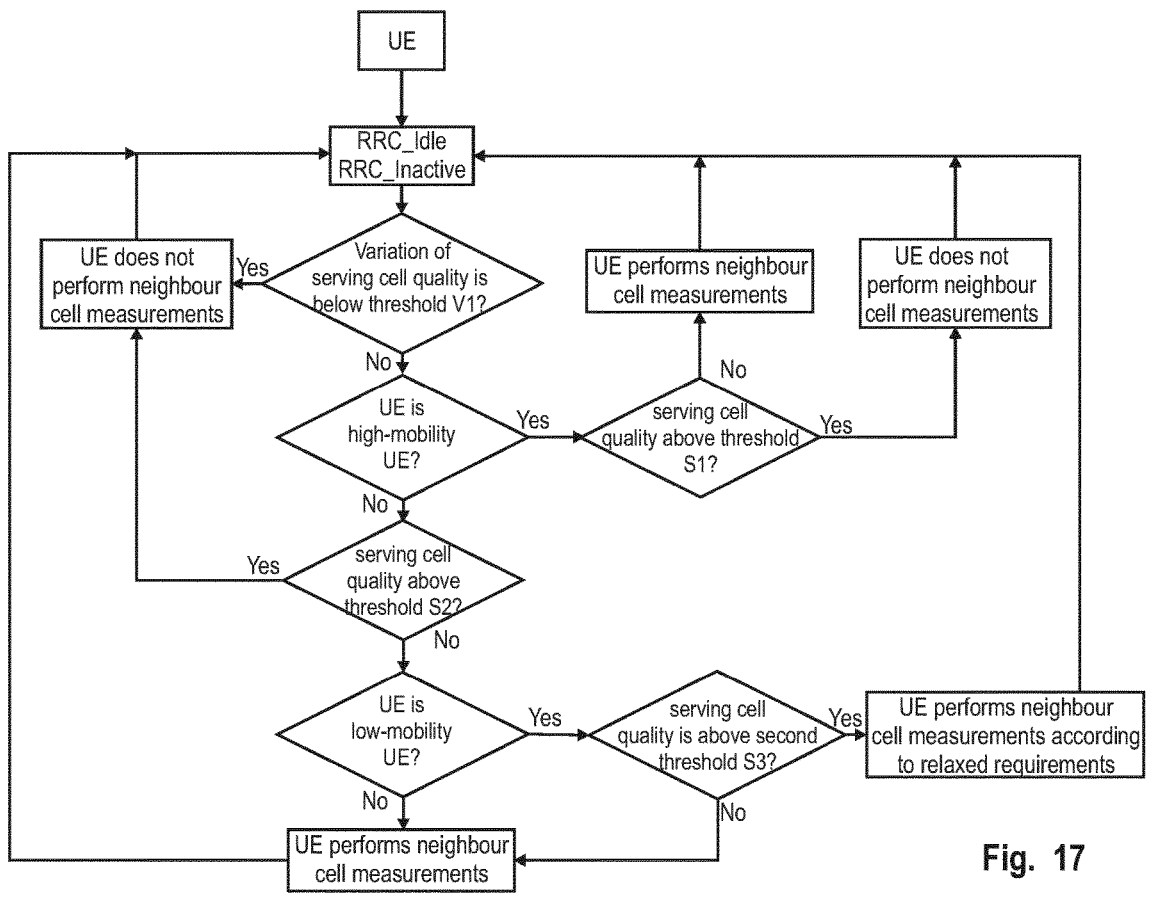
FIG. 17 is a flow diagram for the UE behavior, according to a combination of the solutions of FIGS. 11 and 13, according to an exemplary implementation of the improved measurement procedure.

FIG. 16 and FIG. 17 illustrate an exemplary implementation of a combination of the solution of FIG. 11 with the solution of FIG. 13. FIG. 16 gives an overview on whether and how the UE is to perform neighbor cell measurement relaxation depending on the particular serving cell quality experienced by the UE and the UE's mobility state. Similar to FIG. 15, the illustrated UE behavior according to FIG. 17 takes also into account the first relaxation criterion mentioned above, according to which relaxation is allowed for the UE when one or more of the measured radio measurement quantities for the serving radio cell has changed, during a past period of time, less than a threshold amount (in FIG. 17 named V1) (not shown in FIG. 16). The UE behavior of FIG. 17 shows the inter-dependency between the radio-quality-based relaxation criterion and the mobility state of the UE in order to determine whether and how to relax the neighbor cell measurements. Correspondingly, it is achieved that the high-mobility UE performs measurement relaxation (in fact does not perform measurements at all), only if the serving cell quality is very high, here above the highest threshold S1. For medium-mobility UEs, measurement relaxation is also provided by allowing the medium-mobility UE to not perform neighbor cell measurements, when the serving cell quality is above the medium threshold S2. Finally, in case the UE is in a low-mobility state, it is further determined whether the serving cell quality is below or above the lowest threshold S3. If below, the low-mobility UE is to perform the neighbor cell measurements without relaxation, and if above (previous check in FIG. 17 ensures that serving cell quality is below S2), the low-mobility UE can save power by using relaxed requirements for the neighbor cell measurements.

Figure 18:
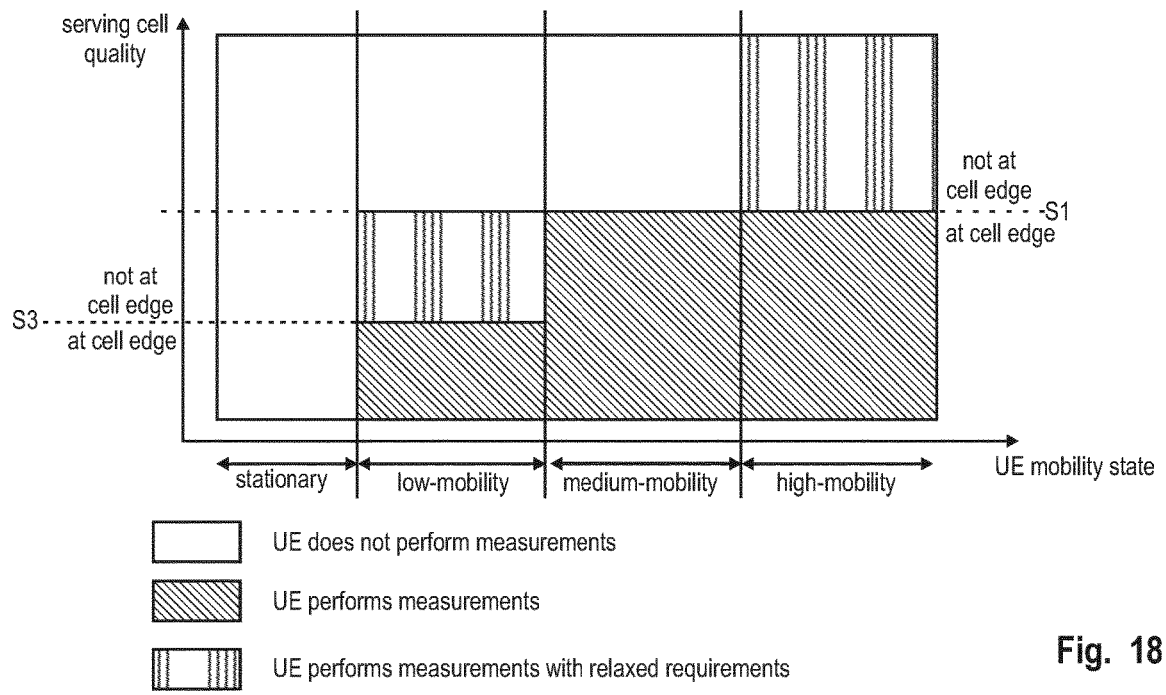
FIG. 18 is a diagram that illustrates whether and how the UE is allowed to relax neighbor cell measurements, depending on the mobility state of the UE and the serving cell quality, according to a combination of the solutions of FIGS. 12 and 13, according to an exemplary implementation of the improved measurement procedure.
Figure 19:
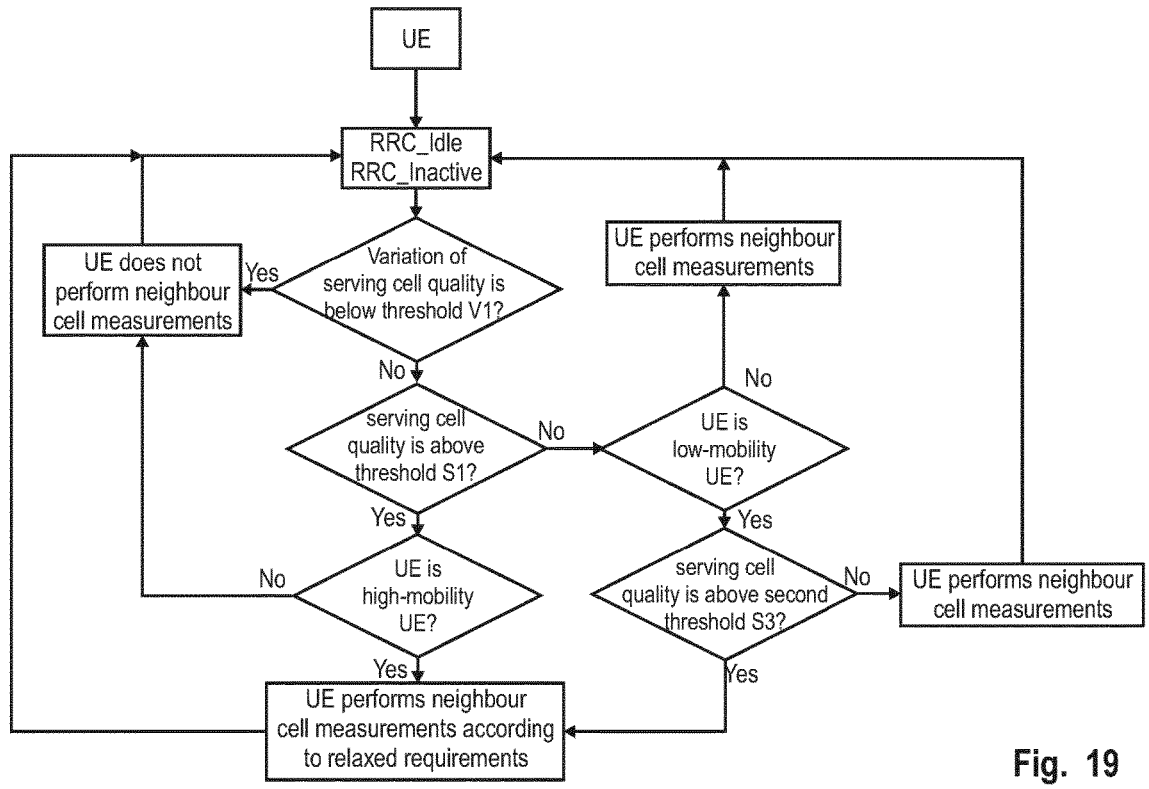
FIG. 19 is a flow diagram for the UE behavior, according to a combination of the solutions of FIGS. 12 and 13, according to an exemplary implementation of the improved measurement procedure.

FIG. 18 and FIG. 19 illustrate an exemplary implementation of a combination of the solution of FIG. 12 with the solution of FIG. 13. FIG. 18 gives an overview whether and how the UE is to perform neighbor cell measurement relaxation depending on the particular serving cell quality experienced by the UE and the UE's mobility state. Similar to FIGS. 15 and 17, the illustrated UE behavior according to FIG. 19 takes also into account the first relaxation criterion mentioned above, according to which relaxation is allowed for the UE when one or more of the measured radio measurement quantities for the serving radio cell has changed, during a past period of time, less than a threshold amount (in FIG. 19 named V1) (not shown in FIG. 18). The UE behavior of FIG. 19 (which is quite similar to the one of FIG. 15) shows the inter-dependency between the radio-quality-based relaxation criterion and the mobility state of the UE in order to determine whether and how to relax the neighbor cell measurements.

Correspondingly, it is achieved that the high-mobility UEs relax the neighbor cell measurements when the serving cell quality is sufficiently high, e.g., above the indicated threshold S1, by performing the neighbor cell measurements according to relaxed measurement requirements. Medium-mobility UEs are also able to relax the neighbor cell measurements when the serving quality is above the indicated threshold S1, in this case allowing the medium-mobility UEs to not perform neighbor cell measurements at all. Moreover, for low-mobility UEs, it is further determined whether the serving cell quality is below or above the lowest threshold S3. If below, the low-mobility UE is to perform the neighbor cell measurements without relaxation, and if above (previous check in FIG. 19 ensures that serving cell quality is below S1), the low-mobility UE can save power by using relaxed requirements for the neighbor cell measurements.

Moreover, the UE may be required to perform neighbor cell measurements of different types, such as intra-frequency measurements, inter-frequency measurements, and inter-RAT measurements. The improved neighbor cell measurement method can be either applied to all the different types of measurements separately, e.g., by determining whether or not to relax each type of measurement separately, thus, e.g., using respectively different rules and thresholds for each type of neighbor cell measurement. Alternatively, relaxation for all or a subset of these measurement types can be controlled together, e.g., by determining whether or not to relax some measurement types together, thus, e.g., using the same rule and thresholds.

One possible exemplary implementation can be similar to the one adopted for LTE, where relaxation of the inter-frequency neighbor cell measurements and inter-RAT neighbor cell measurements is determined using the same radio-quality-related measurement relaxation criteria (e.g., whether one or more radio measurement quantities, Srxlev and Squal, are above respective quantity thresholds, $S_{nonIntraSearchP}$, $S_{nonIntraSearchQ}$), while relaxation of the intra-frequency neighbor cell measurements is separately determined using other radio-quality-related measurement relaxation criteria (e.g., whether one or more radio measurement quantities, Srxlev and Squal, are above respective quantity thresholds, $S_{IntraSearchP}$, $S_{IntraSearchQ}$).

In the above solutions of the improved measurement method, the UE is assumed to determine whether and how to relax the neighbor cell measurements by using certain parameters and thresholds. Typically, the UE is configured by the network, e.g., the base station, on how to perform neighbor cell measurements. Likewise, the thresholds (S1, S2, S3) can be equally determined by the base station and informed to the UEs, e.g., using a system information broadcast.

The above improved measurement procedure also involves determining the mobility state of the UE, based on certain information and parameters, such as one or more thresholds for the number of cell reselections, for the number of beam changes, the fading situation, the position information. Again, these thresholds can be configured by the base station for the UE, and provided to the UE, e.g., in system information broadcast by the UE in its cell.

Further Aspects

According to a first aspect, a user equipment, UE, is provided comprising a processor, which determines one among a plurality of mobility states for the UE, wherein the plurality of mobility states comprises at least three different mobility states. The processor determines one or more radio measurement quantities of a serving radio cell in which the UE is located. The processor determines whether or not to relax radio measurements on one or more neighbor radio cells, based on the determined mobility state of the UE and the determined one or more radio measurement quantities of the serving radio cell. A receiver and the processor of the UE perform the radio measurements on the one or more neighbor radio cells according to radio measurement requirements, when the processor determines not to relax the radio measurements on the one or more neighbor radio cells.

According to a second aspect provided in addition to the first aspect, in case the processor determines to relax radio measurements on the one or more neighbor radio cells, the radio measurements on the one or more neighbor radio cells are not performed at all or are performed according to relaxed radio measurement requirements. The relaxed radio measurement requirements require the UE to perform less often radio measurements than according to the radio measurement requirements.

According to a third aspect provided in addition to the first or second aspect, the plurality of mobility states of the UE comprise a low-mobility state, a medium-mobility state, and a high-mobility state. In an optional implementation, the determining of the mobility state of the UE by the processor is based on one or more of the following:
 the number of cell reselections in a past period of time,
 the number of beam changes in a past period of time,
 the fading situation regarding a radio measurement quantity of the serving cell in a past period of time,
 position information of the UE in a past period of time,
 a characteristic of the UE, such as a UE being mounted on a vehicle, and
 a type of the UE, such as a UE supporting Ultra-Reliable Low-Latency Communication, URLLC.

According to a fourth aspect provided in addition to one of the first to third aspects, the processor determines to relax the radio measurements on the one or more neighbor radio cells, when one or more of a plurality of radio-quality-related measurement relaxation criteria is fulfilled, wherein the plurality of radio-quality-related measurement relaxation criteria comprise:

a first radio-quality-related measurement relaxation criterion, which is fulfilled when one or more of the radio measurement quantities for the serving radio cell has changed, during a past period of time, less than a threshold amount, and
 a second radio-quality-related measurement relaxation criterion, which is fulfilled when one or more of the radio measurement quantities for the serving radio cell is higher than a respective first quantity threshold.

According to a fifth aspect, provided in addition to the fourth aspect, whether the second radio-quality-related measurement relaxation criterion is fulfilled or not depends on the determined mobility state of the UE. For a UE in a determined high-mobility state, the second radio-quality-related measurement relaxation criterion is never fulfilled.

According to a sixth aspect, provided in addition to the fourth aspect, for a UE in a determined high-mobility state, a first value is applied to the first quantity threshold related to the second radio-quality-related measurement relaxation criterion. For a UE in the remaining mobility states, a second value is applied to the first quantity threshold related to the second radio-quality-related measurement relaxation criterion. The first value of the first quantity threshold is larger than the second value of the first quantity threshold.

According to a seventh aspect provided in addition to the fourth aspect, for a UE in a determined high-mobility state, when the second radio-quality-related measurement relaxation criterion is fulfilled, the radio measurements are performed on the one or more neighbor radio cells according to relaxed radio measurement requirements. The relaxed radio measurement requirements require the UE to perform less often radio measurements than according to the radio measurement requirements. In an optional implementation, for a UE in a determined low-mobility state or medium-mobility state, when the second radio-quality-related measurement relaxation criterion is fulfilled, the UE does not need to perform the radio measurements on the one or more neighbor radio cells.

According to an eighth aspect provided in addition to one of the first to seventh aspects, for a UE in a determined low-mobility state, a second quantity threshold is defined for the second radio-quality-related measurement relaxation criterion. When the one of radio measurement quantities of the serving radio cell is higher than the second quantity threshold but smaller than the first quantity threshold, the radio measurements are performed on the one or more neighbor radio cells according to relaxed radio measurement requirements. The relaxed radio measurement requirements require the UE to perform less often radio measurements than according to the radio measurement requirements. When the one of radio measurement quantities of the serving radio cell is higher than the first quantity threshold, the radio measurements on the one or more neighbor radio cells are not performed.

According to a ninth aspect provided in addition to any one of the first to eighth aspects, each of the measurements on the one or more neighbor radio cell is one of different types of an intra-frequency measurement type, an inter-frequency measurement type, and an inter-radio-access-technology measurement type. The determining of whether or not to relax radio measurements on the one or more neighbor radio cells is performed separately for each type of neighbor radio cell measurements or performed together for all or a subset of the types of neighbor radio cell measurements.

According to a tenth aspect, provided in addition to any one of the first to ninth aspects, the one or more radio measurement quantities comprise one or more of the following:
 a Reference Signal Received Power, RSRP, quantity,
 a Reference Signal Received Quality, RSRQ, quantity, and
 a Signal-to-Interference plus Noise Ratio, SINR, quantity.

According to an eleventh aspect, a method is provided comprising the following steps performed by a user equipment, UE. One among a plurality of mobility states is determined for the UE, wherein the plurality of mobility states comprises at least three different mobility states. One or more radio measurement quantities of a serving radio cell in which the UE is located are determined. It is determined whether or not to relax radio measurements on one or more neighbor radio cells, based on the determined mobility state of the UE and the determined one or more radio measurement quantities of the serving radio cell. The UE performs the radio measurements on the one or more neighbor radio cells according to radio measurement requirements, when determining not to relax the radio measurements on the one or more neighbor radio cells.

According to a twelfth aspect, provided in addition to the eleventh aspect, in case of determining to relax radio measurements on the one or more neighbor radio cells, the radio measurements on the one or more neighbor radio cells are not performed at all or are performed according to relaxed radio measurement requirements. The relaxed radio measurement requirements require the UE to perform less often radio measurements than according to the radio measurement requirements.

According to a thirteenth aspect, provided in addition to the eleventh or twelfth aspect, the determining step determines to relax the radio measurements on the one or more neighbor radio cells is performed, when one or more of a plurality of radio-quality-related measurement relaxation criteria is fulfilled. The plurality of radio-quality-related measurement relaxation criteria comprise:
 a first radio-quality-related measurement relaxation criterion, which is fulfilled when one or more of the radio measurement quantities for the serving radio cell has changed, during a past period of time, less than a threshold amount, and
 a second radio-quality-related measurement relaxation criterion, which is fulfilled when one or more of the radio measurement quantities for the serving radio cell is higher than a respective first quantity threshold.

According to a fourteenth aspect, provided in addition to the thirteenth aspect, whether the second radio-quality-related measurement relaxation criterion is fulfilled or not depends on the determined mobility state of the UE. For a UE in a determined high-mobility state, the second radio-quality-related measurement relaxation criterion is never fulfilled.

According to a fifteenth aspect, provided in addition to the thirteenth aspect, for a UE in a determined high-mobility state, a first value is applied to the first quantity threshold related to the second radio-quality-related measurement relaxation criterion. For a UE in the remaining mobility states, a second value is applied to the first quantity threshold related to the second radio-quality-related measurement relaxation criterion. The first value of the first quantity threshold is larger than the second value of the first quantity threshold Hardware and Software Implementation of the Present Disclosure The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A user equipment (UE), comprising:
a processor, which in operation, determines one among a plurality of mobility states of the UE including a first mobility state and a second mobility state,
wherein the processor, in operation, determines one or more radio measurement quantities of a serving radio cell in which the UE is located, and
wherein the processor, in operation, determines to relax radio measurements on one or more neighbor radio cells, when a relaxation criterion is fulfilled, wherein the relaxation criterion uses a relaxation factor which is a positive integer larger than one when the UE is in the first mobility state, and
a receiver which, in cooperation with the processor, perform the radio measurements on the one or more neighbor radio cells according to radio measurement requirements, when the processor determines not to relax the radio measurements on the one or more neighbor radio cells.

2. The UE according to claim 1, wherein in case the processor determines to relax radio measurements on the one or more neighbor radio cells, the radio measurements on the one or more neighbor radio cells are not performed at all or are performed according to relaxed radio measurement requirements, wherein the relaxed radio measurement requirements require the UE to perform less often radio measurements than according to the radio measurement requirements.

3. The UE according to claim 1, wherein the first mobility state is a low-mobility state and the second mobility state is a mobility state higher than the low-mobility state.

4. The UE according to claim 3, wherein the determining of the mobility state of the UE by the processor is based on one or more of the following:
the number of cell reselections in a past period of time,
the number of beam changes in a past period of time,
the fading situation regarding a radio measurement quantity of the serving cell in a past period of time,
position information of the UE in a past period of time, and
a type of the UE.

5. The UE according to claim 1, wherein the processor determines to relax the radio measurements on the one or more neighbor radio cells, when another relaxation criterion is fulfilled, wherein the another relaxation criterion is fulfilled when one or more of the radio measurement quantities for the serving radio cell has changed, during a past period of time, less than a threshold amount.

6. The UE according to claim 1, wherein whether the relaxation criterion is fulfilled or not depends on the mobility state of the UE, and
wherein when the UE is in the second mobility state, the relaxation criterion is never fulfilled.

7. The UE according to claim 1, wherein when the UE is in the second mobility state, a first value is applied to a first quantity threshold related to the relaxation criterion, and
wherein when the UE is in the first mobility state, a second value is applied to the first quantity threshold related to the relaxation criterion, wherein the first value of the first quantity threshold is larger than the second value of the first quantity threshold.

8. The UE according to claim 1, wherein when the UE is in the second mobility state and the relaxation criterion is fulfilled, the radio measurements are performed on the one or more neighbor radio cells according to relaxed radio measurement requirements, wherein the relaxed radio measurement requirements require the UE to perform less often radio measurements than according to the radio measurement requirements, and
wherein when the UE is in the first mobility state and the relaxation criterion is fulfilled, the UE does not need to perform the radio measurements on the one or more neighbor radio cells.

9. The UE according to claim 1, wherein
the relaxation factor is larger than one when the UE is in a non-cell-edge case.

10. The UE according to claim 1, wherein when the UE is in the first mobility state, a second quantity threshold is defined for the relaxation criterion, wherein when one of the one or more radio measurement quantities of the serving radio cell is higher than the second quantity threshold but smaller than a first quantity threshold, the radio measurements are performed on the one or more neighbor radio cells according to relaxed radio measurement requirements, wherein the relaxed radio measurement requirements require the UE to perform less often radio measurements than according to the radio measurement requirements, and
when the one of the one or more radio measurement quantities of the serving radio cell is higher than the first quantity threshold, the radio measurements on the one or more neighbor radio cells are not performed.

11. The UE according to claim 1, wherein each of the radio measurements on the one or more neighbor radio cells is one of different types including an intra-frequency measurement type, an inter-frequency measurement type, and an inter-radio-access-technology measurement type, and
wherein the determining to relax radio measurements on the one or more neighbor radio cells is performed separately for each type of neighbor radio cell measurements or performed together for all or a subset of the types of neighbor radio cell measurements.

12. The UE according to claim 1, wherein the one or more radio measurement quantities comprise one or more of the following:
a Reference Signal Received Power (RSRP) quantity,
a Reference Signal Received Quality (RSRQ) quantity, and
a Signal-to-Interference plus Noise Ratio (SINR) quantity.

13. A method comprising the following steps performed by a user equipment (UE):

determining one among a plurality of mobility states of the UE including a first mobility state and a second mobility state, determining one or more radio measurement quantities of a serving radio cell in which the UE is located, determining to relax radio measurements on one or more neighbor radio cells, when a relaxation criterion is fulfilled, wherein the relaxation criterion uses a relaxation factor which is a positive integer larger than one when the UE is in the first mobility state, and performing the radio measurements on the one or more neighbor radio cells according to radio measurement requirements, when determining not to relax the radio measurements on the one or more neighbor radio cells.

14. The method according to claim 13, wherein in case of determining to relax radio measurements on the one or more neighbor radio cells, the radio measurements on the one or more neighbor radio cells are not performed at all or are performed according to relaxed radio measurement requirements, wherein the relaxed radio measurement requirements require the UE to perform less often radio measurements than according to the radio measurement requirements.

15. The method according to claim 13, wherein the first mobility state is a low-mobility state and the second mobility state is a mobility state higher than the low-mobility state.

16. The method according to claim 13, wherein the determining step determines to relax the radio measurements on the one or more neighbor radio cells, when another relaxation criterion is fulfilled, wherein the another relaxation criterion is fulfilled when one or more of the radio measurement quantities for the serving radio cell has changed, during a past period of time, less than a threshold amount.

17. The method according to claim 13, wherein whether the relaxation criterion is fulfilled or not depends on the mobility state of the UE, and wherein when the UE is in the second mobility state, the relaxation criterion is never fulfilled.

18. The method according to claim 13, wherein when the UE is in the second mobility state, a first value is applied to a first quantity threshold related to the relaxation criterion, and wherein when the UE is in the first mobility state, a second value is applied to the first quantity threshold related to the relaxation criterion, wherein the first value of the first quantity threshold is larger than the second value of the first quantity threshold.

* * * * *